(12) United States Patent
Hill et al.

(10) Patent No.: US 12,373,751 B2
(45) Date of Patent: Jul. 29, 2025

(54) MINING SYSTEM

(71) Applicant: Technological Resources Pty. Limited, Brisbane (AU)

(72) Inventors: Andrew Hill, Red Hill (AU); Thomas Albrecht, Red Hill (AU); Konstantin M. Seiler, Red Hill (AU); Andrew W. Palmer, Red Hill (AU); Steven J. Scheding, Red Hill (AU); Glenn Callow, Red Hill (AU)

(73) Assignee: TECHNOLOGICAL RESOURCES PTY LIMITED, Brisbane (AU)

( * ) Notice: Subject to any disclaimer, the term of this patent is extended or adjusted under 35 U.S.C. 154(b) by 1287 days.

(21) Appl. No.: 16/764,731

(22) PCT Filed: Oct. 31, 2018

(86) PCT No.: PCT/AU2018/051176
§ 371 (c)(1),
(2) Date: May 15, 2020

(87) PCT Pub. No.: WO2019/095004
PCT Pub. Date: May 23, 2019

(65) Prior Publication Data
US 2021/0174279 A1 Jun. 10, 2021

(30) Foreign Application Priority Data
Nov. 15, 2017 (AU) .................. 2017904625

(51) Int. Cl.
*G06Q 10/0631* (2023.01)
*G05B 19/418* (2006.01)
(Continued)

(52) U.S. Cl.
CPC . *G06Q 10/06313* (2013.01); *G05B 19/41865* (2013.01); *G06Q 10/103* (2013.01);
(Continued)

(58) Field of Classification Search
CPC ...... G06Q 10/04; G06Q 10/047; G06Q 10/06; G06Q 10/06313; G06Q 10/0631;
(Continued)

(56) References Cited

U.S. PATENT DOCUMENTS

2008/0046272 A1* 2/2008 Menabde ................ E21C 41/00
705/308
2009/0096637 A1* 4/2009 Olson ....................... E02F 9/26
340/993

(Continued)

FOREIGN PATENT DOCUMENTS

CA 2992053 A1 8/2018
CA 3071158 A1 1/2019

OTHER PUBLICATIONS

Tan et al., A Practical Simulation Approach For An Effective Truck Dispatching System Of Open Pit Mines Using VBA, 2016 Winter Simulation Conference (WSC) IEEE, pp. 2394-2405 (Year: 2016).*
(Continued)

*Primary Examiner* — Robert D Rines
(74) *Attorney, Agent, or Firm* — Banner & Witcoff, Ltd.

(57) ABSTRACT

A mining system for directing mine operations including a flow planner and a dispatcher. The flow planner receives operating parameters and global mine data and calculates a flow plan based on the operating parameters and the global parameters. The dispatcher then determines dispatch assignments based on the flow plan from the flow planner, and effects a dispatch of mining equipment based on the dispatch assignments.

13 Claims, 23 Drawing Sheets

(51) Int. Cl.
   *G06Q 10/10*    (2023.01)
   *G06Q 50/02*    (2012.01)
   *E21F 17/00*    (2006.01)
(52) U.S. Cl.
   CPC .............. *G06Q 50/02* (2013.01); *E21F 17/00* (2013.01); *G05B 2219/32423* (2013.01)
(58) Field of Classification Search
   CPC ................ G06Q 10/103; G06Q 50/02; G05B 19/41865; G05B 2219/32423; E21C 41/00; E21F 13/00; E21F 17/00
   See application file for complete search history.

(56) References Cited

U.S. PATENT DOCUMENTS

| | | |
|---|---|---|
| 2012/0046983 A1 | 2/2012 | Nettleton et al. |
| 2016/0161947 A1 | 6/2016 | Liao et al. |
| 2016/0292933 A1* | 10/2016 | Sprock .................. G06Q 50/08 |
| 2016/0314421 A1* | 10/2016 | Watkins ........... G06Q 10/06313 |
| 2018/0068484 A1* | 3/2018 | Jarami Orellana ..... G06F 30/20 |
| 2018/0108094 A1* | 4/2018 | Poole ..................... G06Q 50/02 |
| 2018/0247207 A1* | 8/2018 | Ristovski ............... G06N 20/20 |
| 2019/0033808 A1* | 1/2019 | Mountford ........... G05B 19/042 |

OTHER PUBLICATIONS

Feb. 22, 2019—(WO) International Search Report and Written Opinion—App PCT/AU2018/051176.
Mar. 13, 2020—(WO) International Preliminary Report on Patentability—App PCT/AU2018/051176.
Aug. 23, 2023—(CA) Office Action—App 3,082,289.

* cited by examiner

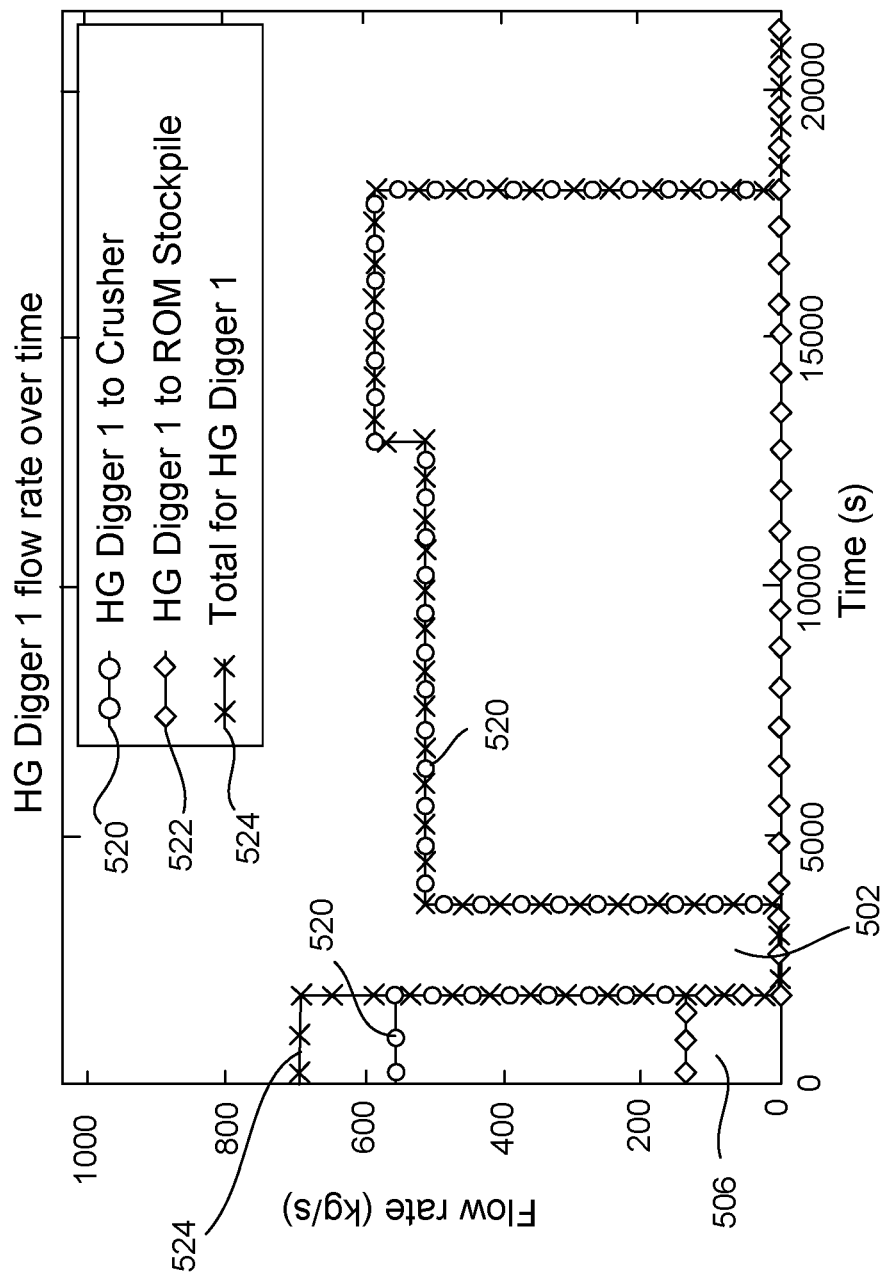
Fig. 4(a)  (a) High Grade Digger 1

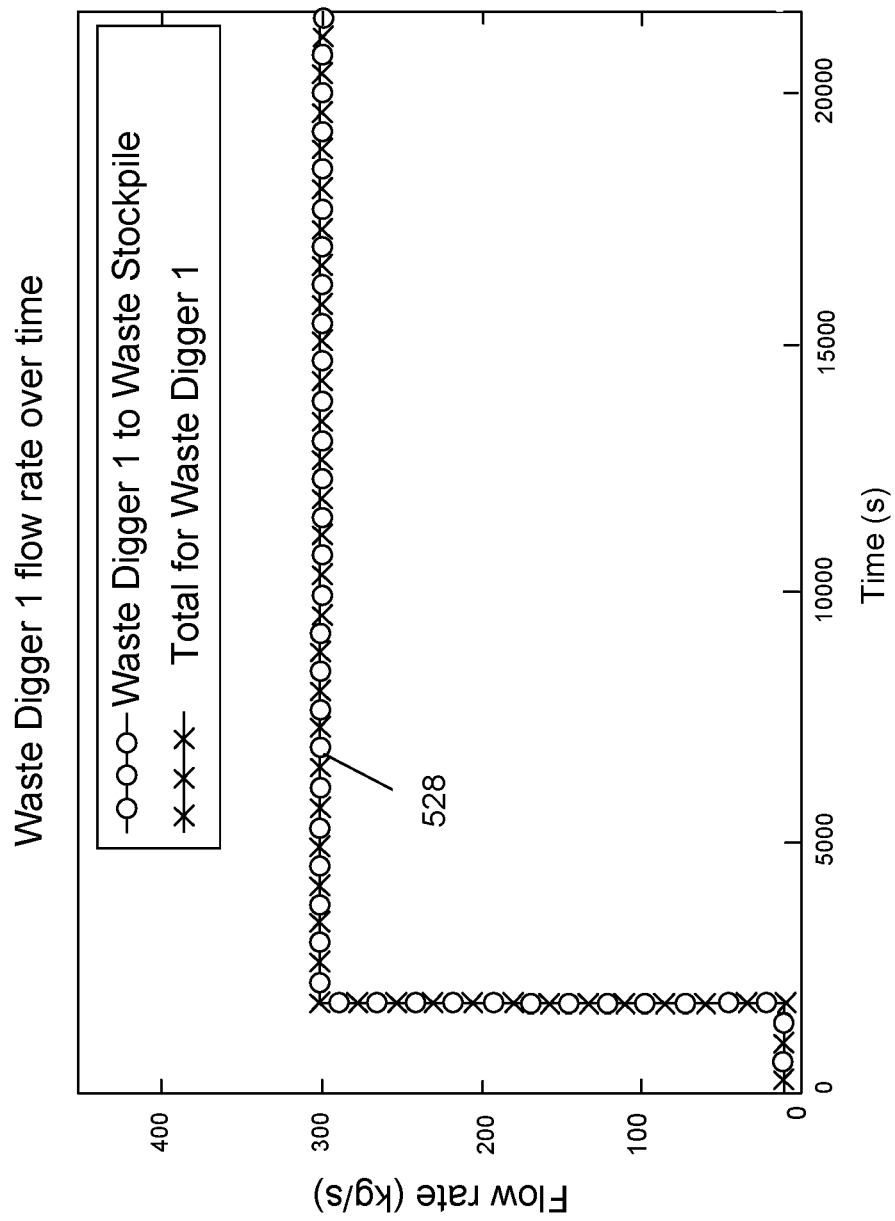

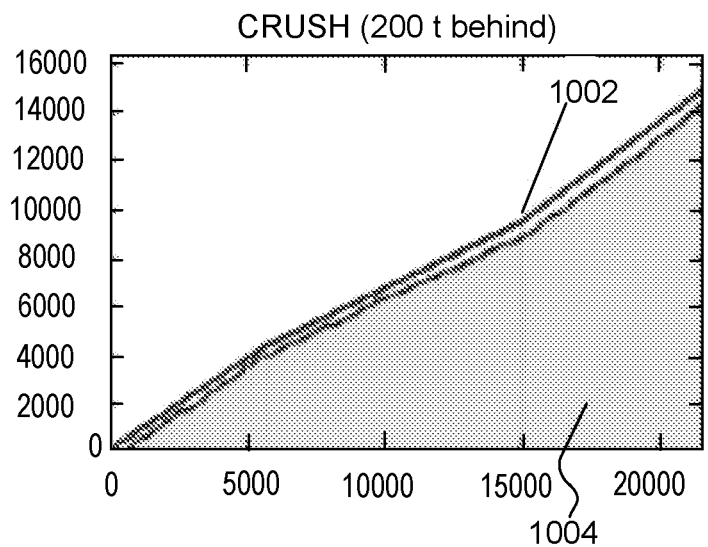
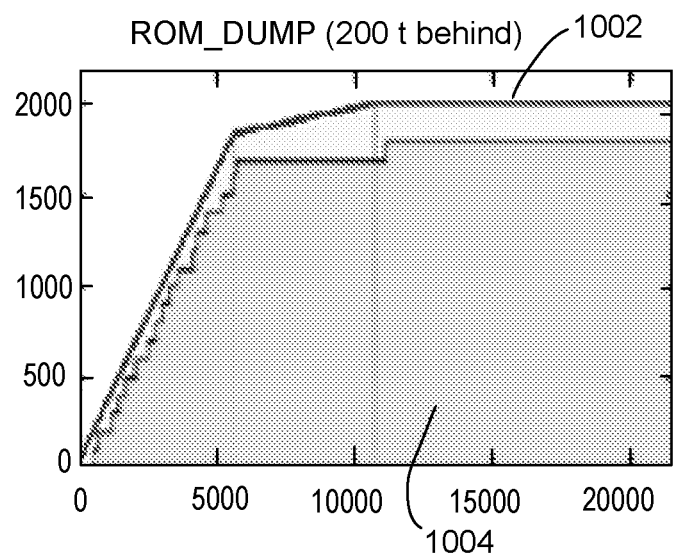
Fig.8(b)
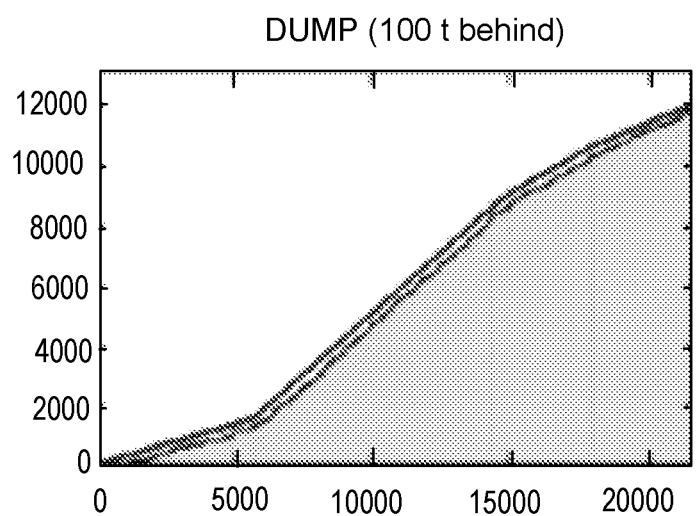

MINING SYSTEM

CROSS REFERENCE TO RELATED APPLICATIONS

The present application is a U.S. National Phase of International Application No. PCT/AU2018/051176, filed on Oct. 31, 2018, designating the United States of America, which claims priority to Australian Patent Application No. 2017904625, filed on Nov. 15, 2017. This application claims priority to and the benefit of the above-identified applications, the disclosures of which are incorporated by reference herein in their entirety.

TECHNICAL FIELD

The present disclosure relates generally to operating mining equipment, and more particularly to a mining system for directing mine operations.

BACKGROUND

Mines operate to achieve defined targets within certain constraints. The defined targets are usually outlined in a mine plan, sometimes referred to as a "plan of the day" or PLOD. These targets include, for example, production targets (e.g. a tonnage of ore per specific time duration).

In order to achieve the defined targets, assets that are available for achieving the targets are deployed. This is typically done by scheduling the implementation of the assets in order to achieve the required material flow, taking into consideration constraints of the operation, for example, the available road network, equipment availability, and other constraints related to the operation of the equipment (e.g. speed, capacity, etc.)

In complex operations, scheduling and deployment of assets are often overseen by operators who are required to provide input to the assignment of assets to tasks, and who are also able to override mechanised assignment operations.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

In one aspect there is provided a mining system for directing operation of mining equipment within a mine operation, the system including:
a parameter module providing operating parameters;
a data input module providing global mine data and updated global mine data, wherein the updated global mine data includes a stream of sensor data;
a flow planner module that is in communication with the parameter module and the data input module to receive the operating parameters and the global mine data, and the flow planner module determining at least one planned flow rate based on the operating parameters and the global mine data, wherein the flow planner module determines at least one updated planned flow rate based on the updated global mine data; and
a dispatcher module that autonomously directs operation of the mining equipment based on the at least one updated planned flow rate received from the flow planner module.

In another aspect there is provided a mining system for directing mine operations, the system including:
a flow planner that receives operating parameters and global mine data and calculates a flow plan based on the operating parameters and the global parameters; and
a dispatcher that determines dispatch assignments based on the flow plan from the flow planner, and effects a dispatch of mining equipment based on the dispatch assignments.

The operating parameters may include at least one production target and at least one cost-related goal.

The global mine data may include at least one of the following mine operation data: historical data, current system operational data, asset data, and future estimates.

The flow plan may be for a flow planning window of time, and the flow plan may include at least one planned flow rate for the flow planning window. The at least one planned flow rate may vary with time within the flow planning window.

In another aspect there is provided a mining system for directing mine operations, the system including:
a planner providing operating parameters;
a data input providing global mine data;
a flow planner that:
receives the operating parameters from the planner and receives the global mine data from the data input, and
determines at least one planned flow rate by optimising a first objective function defined by at least one of each of the operating parameters and the global mine data, wherein the first objective function includes a cost function; and
a dispatcher that determines dispatch assignments based on the at least one planned flow rate from the flow planner, and effects a dispatch of equipment based on the dispatch assignments.

The cost function may include at least one of the following: equipment operating costs, equipment underutilisation costs, and plan failure costs.

The flow planner may optimise the first objective function subject to at least one planned asset availability constraint.

The flow planner may further smooth the at least one planned flow rate. The flow planner may smooth the at least one planned flow rate by reducing a magnitude of change in the at least one planned flow rate between successive units of time. The flow planner may smooth the at least one planned flow rate by optimising a second objective function that includes a sum of flow differences. The sum of flow differences may include a difference in a magnitude of a planned flow rate between successive units of time. The second objective function may be constrained by a magnitude of change in the at least one planned flow rate between successive units of time. The second objective function may be subject to at least one of a first additional constraint and a second additional constraint. The additional first and second constraints may reduce a computational time to optimise the second objective function.

The flow planner may determine the at least one planned flow rate for a flow planning window of time, and at least one planned flow rate may vary with time over the flow planning window.

In another aspect there is provided a mining system for directing mine operations, the system including:
a flow planner configured to:
receive operating parameters and global mine data, the operating parameters including a material flow target, and
generate a material flow plan to achieve the material flow target; and a dispatcher configured to:
   determine dispatch assignments based on the material flow plan from the flow planner, and
   effect a dispatch of assets based on the dispatch assignments,
wherein the material flow plan spans a predetermined period of time, and specifies a planned flow rate for each time unit within the predetermined period of time.

The predetermined period of time may be defined by a flow planning window of time. The planned flow rate may vary within the flow planning window.

In another aspect there is provided a mining system for directing mine operations, the system including:
   a planner providing operating parameters;
   a data input providing global mine data;
   a flow planner that receives the operating parameters and the global mine data, and determines at least one planned flow rate based on at least one of each of the operating parameters and the global mine data, wherein the at least one planned flow rate varies over time; and
   a dispatcher that determines dispatch assignments based on the at least one planned flow rate from the flow planner, and effects a dispatch of equipment based on the dispatch assignments.

The flow planner may determine the at least one planned flow rate by optimising a goal defined by at least one of each of the operating parameters and the global mine data within a flow planning window of time.

In another aspect there is provided a mining system for directing mine operations, the system including:
   a planner providing operating parameters;
   a data input providing global mine data and updated global mine data;
   a flow planner that receives the operating parameters and the global mine data, and determines at least one planned flow rate based on at least one of each of the operating parameters and the global mine data, wherein the flow planner determines at least one updated planned flow rate based on the updated global mine data; and
   a dispatcher that determines dispatch assignments based on the at least one updated planned flow rate from the flow planner, and effects a dispatch of mining equipment based on the dispatch assignments.

The flow planner may periodically determine at least one updated planned flow rate.

The flow planner may include a replanning loop that automatically determines at least one updated planned flow rate.

The flow planner may determine the at least one planned flow rate over an initial flow plan window, and the flow planner may determine the at least one updated planned flow rate over a replanning flow plan window. The replanning flow plan window may have one of the following: a decreasing horizon, and a receding horizon.

The flow planner may determine the at least one updated planned flow rate when a trigger event occurs.

In another aspect there is provided a mining system for directing mine operations, the system including:
   a planner providing operating parameters;
   a data input providing global mine data;
   a flow planner that receives the operating parameters and the global mine data, and determines a flow plan based on at least one of each of the operating parameters and the global mine data; and
   a dispatcher that determines dispatch assignments based on the flow plan and the global mine data, and effects a dispatch of equipment based on the dispatch assignments,
wherein the flow plan includes at least one planned flow rate that varies over time, and
wherein the dispatcher determines the dispatch assignments so as to effect an actual flow rate that varies over time in alignment with the at least one planned flow rate that varies over time.

The flow plan may span a flow planning window of time, and the at least one planned flow rate may vary over the flow planning window of time. The dispatcher may determine dispatch assignments for a dispatch planning window of time that is shorter than the flow planning window of time. The dispatcher may update the dispatch assignments for successive dispatch planning windows so that the actual flow rate varies in alignment with the at least one planned flow rate that varies over time.

In another aspect there is provided a mining system for directing mine operations, the system including:
   a planner providing operating parameters;
   a data input providing global mine data;
   a flow planner configured to:
     receive the operating parameters and the global mine data, and
     determine a flow plan based on at least one of each of the operating parameters and the global mine data; and
   a dispatcher that determines dispatch assignments based on the flow plan and the global mine data, and effects a dispatch of equipment based on the dispatch assignments,
wherein the dispatcher includes a dispatcher feedback loop, and the dispatcher uses the dispatcher feedback loop to update the dispatch assignments.

The dispatcher may determine the dispatch assignments for a dispatch planning window of time. The flow planner may determine the flow plan for a flow planning window of time, and the dispatch planning window may be a moving window within the flow planning window. The dispatch planning window may have a length of substantially one activity period.

The flow planner may determine an updated flow plan, and the dispatcher may update the dispatch assignments based on at least one of:
   updated global mine data provided by the data input, and
   the updated flow plan provided by the flow planner.

In another aspect there is provided a mining system for directing mine operations, the system including:
   a planner providing operating parameters;
   a data input providing global mine data;
   a flow planner that receives the operating parameters and the global mine data, and determines a flow plan based on at least one of the operating parameters and the global mine data, wherein the flow plan is determined over a flow planning window of time; and
   a dispatcher that:
     determines dispatch assignments based on the flow plan and the global mine data,
     updates the dispatch assignments at least once during the flow planning window, and
     effects a dispatch of equipment based on the updated dispatch assignments so that the dispatch of equipment aligns with the flow plan.

The dispatcher may determine the dispatch assignments for a dispatch planning window of time. The dispatch planning window may be a moving window within the flow planning window. The dispatch planning window may have a length of substantially one activity period.

The flow planner may determine an updated flow plan, and the dispatcher may update the dispatch assignments based on at least one of:
  updated global mine data provided by the data input, and
  the updated flow plan provided by the flow planner.

In another aspect there is provided a mining system for directing mine operations, the system including:
  a planner providing operating parameters;
  a data input providing global mine data;
  a flow planner that receives the operating parameters and the global mine data, and determines a flow plan based on at least one of the operating parameters and the global mine data; and
  a dispatcher that determines dispatch assignments based on the flow plan and the global mine data, and effects a dispatch of equipment based on the dispatch assignments,
wherein at least one of the following conditions apply:
  the flow plan includes at least one planned flow rate that varies over time, and
  the dispatcher effects the dispatch of equipment so as to result in a varying actual flow rate.

The operating parameters may include at least one production target and at least one cost-related goal.

The global mine data may include at least one of the following mine operation data: historical data, current system operational data, asset data, and future estimates.

The flow plan may be for a flow planning window of time, and the at least one planned flow rate may be a piecewise constant function of time over the flow planning window.

The dispatcher may update the dispatch assignments and based on the updated dispatch assignments effect a dispatch of equipment so that the dispatch of equipment aligns with the flow plan.

In another aspect there is provided a mining system for directing mine operations, the system including:
  a planner providing operating parameters;
  a data input providing global mine data;
  a flow planner that receives the operating parameters and the global mine data, and determines a flow plan based on at least one of the operating parameters and the global mine data, wherein the flow plan includes at least one the planned flow rate that varies over a flow planning window of time; and
  a dispatcher that determines dispatch assignments based on the flow plan from the flow planner, and effects a dispatch of equipment based on the dispatch assignments, wherein the dispatch of equipment effects an actual flow rate that is aligned with the at least one planned flow rate that varies so that the actual flow rate also varies over the flow planning window.

The flow planner may determine the flow plan by optimising a goal defined by at least one of each of the operating parameters and the global mine data within a flow planning window of time.

The dispatcher may determine the dispatch assignments by optimising a dispatch goal over a dispatch planning window of time.

The dispatcher may periodically recalculate the dispatch assignments over the dispatch planning window thereby providing updated dispatch assignments according to which the dispatch of equipment may effect the actual flow rate to be aligned with the at least one planned flow rate that varies. The dispatch planning window may be a moving window with a receding horizon.

In another aspect there is provided a mining system for directing mine operations, the system including:
  a planner providing operating parameters;
  a data input that includes an estimator, wherein the estimator determines and provides future estimates, and wherein the data input provides global mine data that includes the future estimates;
  a flow planner that receives the operating parameters and the global mine data, and determines a flow plan based on at least one of the operating parameters and the global mine data, wherein the flow plan is determined over a flow planning horizon; and
  a dispatcher that determines dispatch assignments based on the flow plan from the flow planner, and effects a dispatch of equipment based on the dispatch assignments,
wherein the estimator updates the future estimates at least once during the flow planning horizon.

The estimator may determine the future estimates based on current data and historical data from a mine operation.

The future estimates may include an estimated asset parameter. The estimated asset parameter includes an activity duration estimate.

The estimator may determine the estimated asset parameter by determining a set of asset parameters, and merging the set of asset parameters to obtain an estimated asset parameter.

The estimator may determine the future estimates using a combination of empirical and generative estimation methods.

The future estimate may be determined based on at least one of the following: an asset identifier, and asset descriptor, an asset task, and an asset parameter.

The estimator may include a multi-stage filter for map matching.

The estimator may receive data queries from at least one of the flow planner and the dispatcher, and the estimator may condition the received queries based on a conditioning parameter.

In another aspect there is provided a mining system for directing mine operations, the system including:
  a planner providing operating parameters;
  a data input providing global mine data and updated global mine data;
  a flow planner configured to:
    receive the operating parameters and the global mine data, and
    determine a flow plan for a flow planning window of time that ends at a flow planning horizon, wherein the flow planner determines the flow plan based on at least one of each of the operating parameters and the global mine data; and
  a dispatcher configured to:
    receive the global mine data and the flow plan from the flow planner,
    determine dispatch assignments based on the flow plan and the global mine data, and
    effect a dispatch of equipment based on the dispatch assignments;
wherein:
  the flow planner receives the updated global mine data and determines an updated flow plan based on the updated global mine data, the dispatcher determines updated dispatch assignments based on at least one of: the updated global mine data and the updated flow plan, and the dispatcher effects the dispatch of equipment based on the updated dispatch assignments, and the dispatcher determines the updated dispatch assignments at a greater frequency during the flow planning window than the flow planner determines the at least one updated planned flow rate.

The flow planner may include a flow planner feedback loop that determines the updated flow plan, and wherein the dispatcher includes a dispatcher feedback loop that updates the dispatch assignments. The flow planner feedback loop and the dispatcher feedback loop may be responsive to dynamic inputs and fixed inputs.

The flow planner may determine the updated flow plan for a replanning flow plan window of time that ends at the flow planning horizon.

The flow planning horizon may be at a fixed time.

The dispatcher may determine the updated dispatch assignments periodically based on at least one of the following conditions:
  when the dispatcher receives the updated flow plan,
  when the dispatcher receives the updated global mine data,
  when a current state of the mine operation becomes incompatible with determined dispatch assignments,
  every 20 to 60 minutes,
  at every decision point in an asset deployment, and
  when an asset completes a current assignment.

The dispatcher may determine dispatch assignments for a dispatch planning window of time that is shorter than the flow planning window. The dispatcher may determine the updated dispatch assignments for successive dispatch planning windows so that an actual flow rate tracks the flow plan. The dispatch planning window may be a moving window within the flow planning window. The moving window may have a receding horizon.

The dispatch planning window may have a length of substantially one activity period.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the disclosure are now described by way of example with reference to the accompanying drawings in which:—

FIG. 3 illustrates a comparison of flow rates with various smoothing approaches as follows.

FIG. 4 illustrates flow rates determined for equipment in an exemplary embodiment:
FIG. 4(a) illustrates the flow rates for example High Grade (HG) Digger 1;
FIG. 4(c) illustrates the flow rate from example Waste Digger 1 to a waste stockpile.

FIG. 8(b) illustrates the flow performance at the crusher, ROM dump, and dump when dispatch assignments are made with embodiments of the systems and methods described herein.

DESCRIPTION OF EMBODIMENTS

Figure 1A:
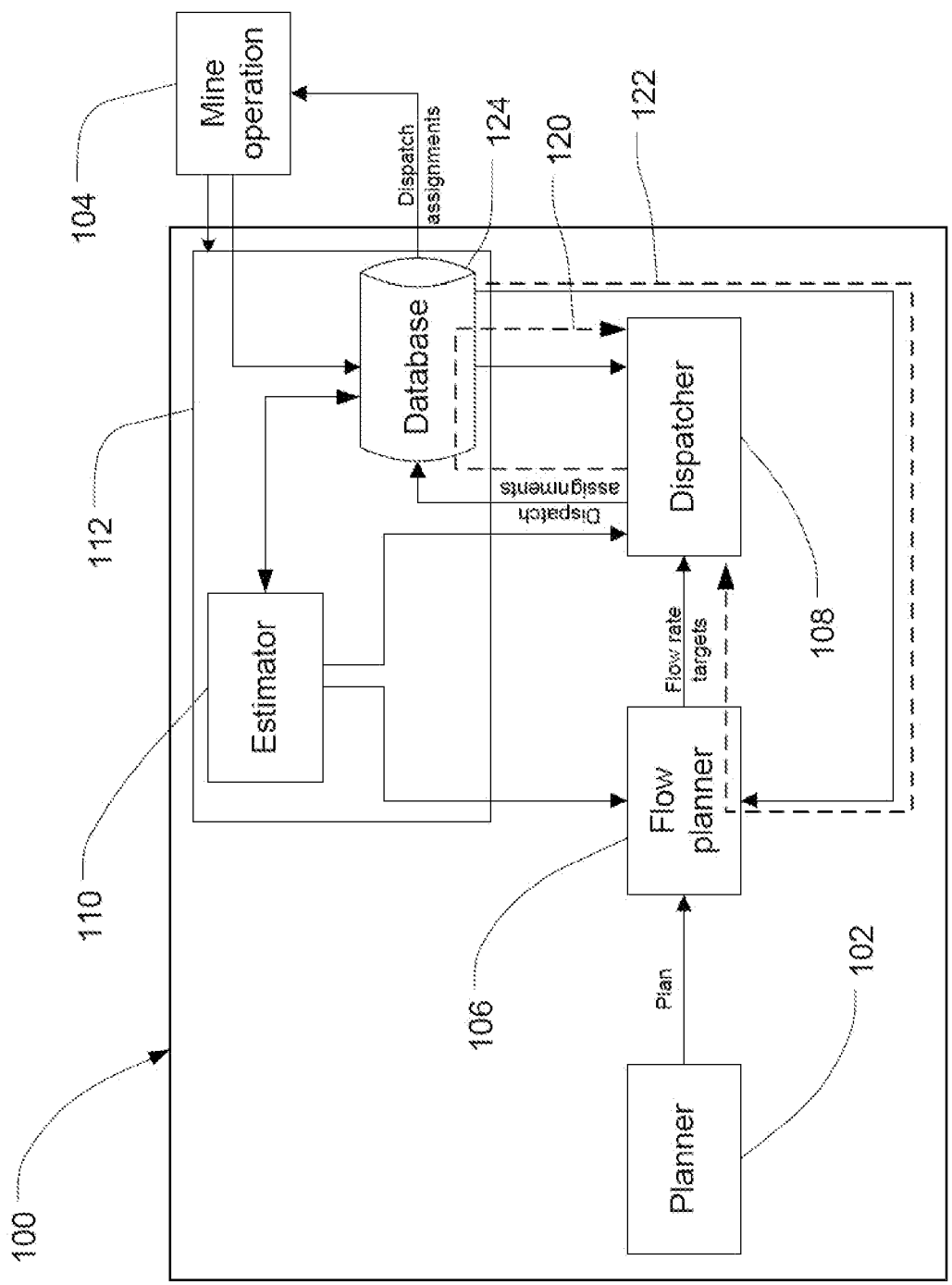
FIG. 1A is a schematic overview of an embodiment of a mining system.

As used herein, "mine operations" refers to operations that include but are not limited to material handling (e.g. material excavation, material loading, material haulage, material dumping, and material crushing), road grading, vehicle/fleet maintenance, and other operations that directly contribute to the production of mined material in a mine or which are otherwise in support of such directly contributing operations.

The rate at which material is handled (e.g. hauled, excavated, loaded, dumped, crushed, etc.) in a mine operation is referred to as a material flow rate or simply as a flow rate. A material flow plan, also referred to as a "flow plan" herein, includes one or more flow rates that the system aims to achieve, and these are referred to herein as "planned flow rates".

Existing systems that are tasked with scheduling the dispatch of assets in order to achieve planned flow rates for mine operations, generally aim to optimise a specific objective at a certain time, such as instantaneous activity. As such, systems used for scheduling and assigning assets for material haulage typically optimize plans for material flow to maximise the instantaneous rate at which material is hauled. A disadvantage of optimising material haulage for instantaneous material flow rate is that doing so does not necessarily result in achieving an overall plan for a mine operation, i.e. achieving the goals defined in a mine plan for a particular shift or over a period of time.

The overall plan for a mine operation is referred to herein generally as "operating parameters". The operating parameters include defined parameters and/or targets that are set as a goal for the particular mine operation, for example the operating parameters may include one or more production targets and/or one or more material flow targets (that is, a desired flow rate for a material from point A to point B, and optionally with a defined completion time and/or associated equipment). In some embodiments of the systems and methods described herein the operating parameters may also include cost-related goals, e.g. minimising the costs of operating one or more assets or asset classes.

How existing dispatch systems operate may be understood with reference to this simplified example: if the mine plan provides a production target of 12 kton to be achieved over one 12-hour shift, then a dispatcher will typically optimise the dispatch of the available equipment (e.g. haul trucks) in view of the available road network in order to achieve an approximately constant flow rate of 12 kton/12 hours=1 kton/h from the start to the end of the shift. The dispatch schedule is usually calculated offline before the shift starts, based on the production target, and then implemented without revision with the aim of achieving a maximum instantaneous flow (of at least 1 kton/h for this example). Typically an operator may change the input parameters over time to control the system, and under such circumstances the operator may initiate a recalculation of the required steady-state flow rate.

Existing systems therefore typically include no or only very basic flow planning functionality, because the conventional calculation of [production target]/[length of shift] yields a steady state value (e.g. 1 kton/h as explained above). It follows that existing systems also determine a dispatch schedule that results in a linear cumulative flow. This is illustrated in FIG. 1B of the drawings where the planned flow rate graph 130 shows a typical steady state planned flow rate 132, and the cumulative flow graph 140 shows a typical linearly increasing cumulative flow 142 for which the actual flow rate is substantially constant.

In contrast, embodiments of the mining system and methods described herein provide both planned flow rates and dispatch assignments that can be described by functions that vary over time. This is illustrated in FIG. 1B by the piecewise constant planned flow rate 134 and the varying rate of the cumulative flow 144 that tracks the changes of the piecewise constant planned flow rate 134. One reason why flow plans with varying planned flow rates may be useful is that the operating parameters may include other factors in addition to the production targets. In an exemplary embodiment, the flow planner of the system described herein determines one or more optimised planned flow rates to achieve one or more production targets while minimising the cost of doing so, and this results in a set of planned flow rates that are not necessarily all steady-state. As a result, a simple linearly increasing cumulative flow is unlikely to track a time-dependent planned flow rate.

Accordingly, as used herein unless the context clearly indicates otherwise, "planned flow rate" refers to a planned flow rate as a function of time.

Using a dispatcher that is able to plan and execute the assignment of assets that include mining equipment in order to achieve a flow plan with one or more planned flow rates that are variable over time (i.e. not steady-state), means that the system and methods described herein are able to more closely track an overall plan as defined by operating parameters that may include factors in addition to production targets.

Existing systems typically do not direct asset assignment taking into consideration factors that may be variable over a planning horizon (e.g. over a shift). Instead, existing dispatch systems tend to adjust retroactively in response to unforeseen events, for example after a problem has already manifested and is affecting operation. This typically results in less than optimal adjustments to compensate for the manifested problem, and may also require extensive manual intervention.

In contrast, where planned flow rates and/or dispatch assignments have been determined taking into consideration factors that may be variable over the relevant time period, some of these previously "unforeseen events" may be anticipated and incorporated into the planned flow rates and/or by the dispatcher in determining dispatch assignments. Examples of such factors include maintenance of equipment and traffic patterns.

Where unpredictable events do occur, the system described herein is able to adjust automatically and continually by replanning and taking into consideration changed conditions. The planned flow rates may be updated during a shift, and the dispatch assignments may also be recalculated and updated during a shift. Consequently the actual cumulative flow tracks the planned flow rates and the production targets better and with less deviation than is the case for existing systems.

Figure 1B:
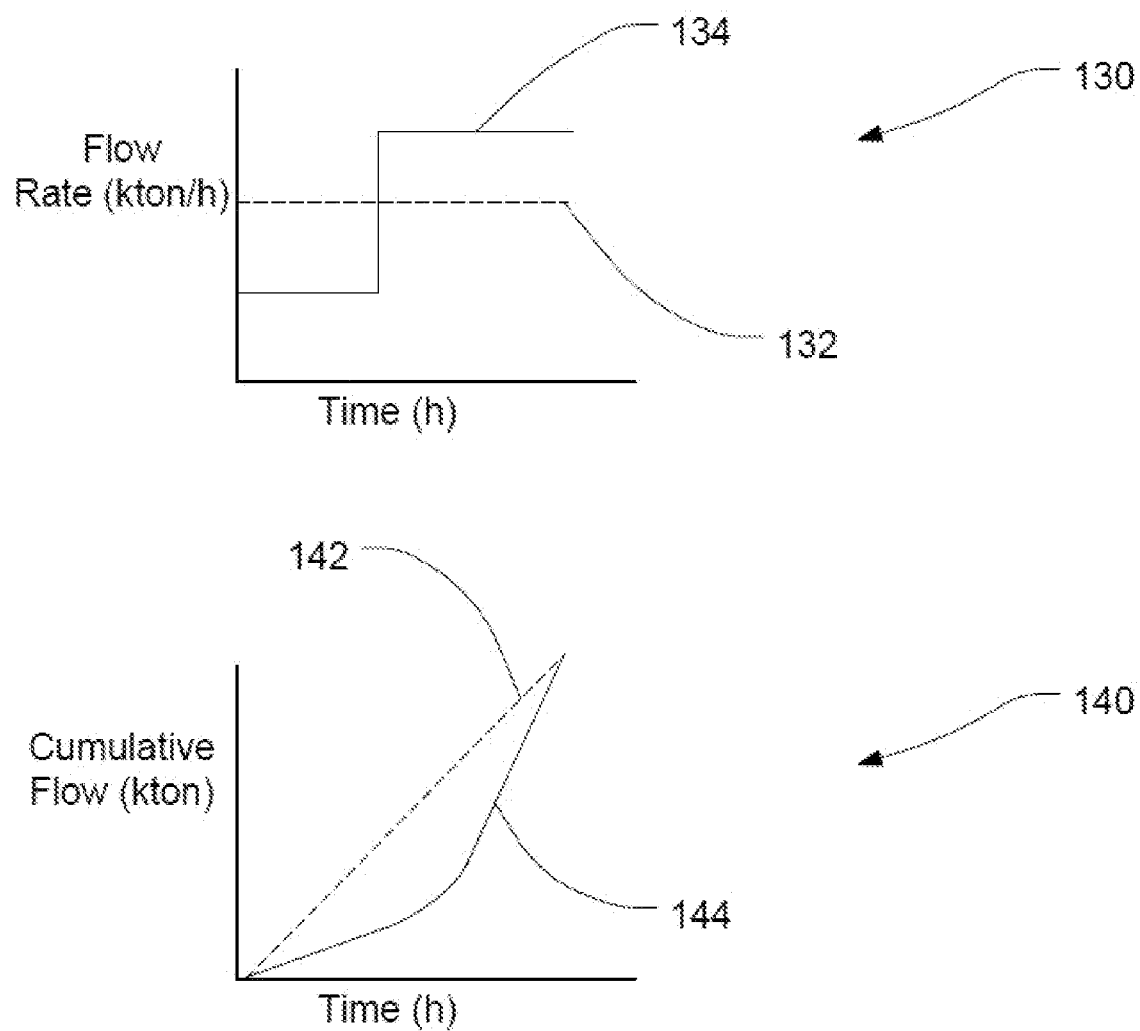
FIG. 1B illustrates an exemplary planned flow rate and cumulative flow of a prior art dispatch system compared to the present system.

FIG. 1A of the drawings illustrates an embodiment of assignment mining system 100 used for directing operation of mining equipment within a mine operation 104, wherein the directing includes asset assignment (i.e. assignment of mining equipment) and scheduling deployment of mining equipment. The system 100 has a planner 102 (also referred to herein as a "parameter module") that provides a plan with respect to the operation of a mine, the plan being in the form of operating parameters. In some embodiments the planner 102 forming part of the system 100 receives a plan from a source external to the system 100 (for example, the plan may be manually entered by an operator, or received from another planning system), and provides that received externally generated plan. In other embodiments the planner 102 may generate the plan as part of the operation of the system 100, and the planner 102 then generates and provides the plan for use in the system 100.

The system 100 has a data input 112 (also referred to herein as a "data input module") that provides global mine data to various parts of the system 100. In some embodiments the data input 112 includes a data interface and some or all of the global mine data is provided from a source external to the system 100. In the embodiment illustrated in FIG. 1A, the data input 112 is a data source that forms part of the system 100 and includes an estimator 110 and a database 124. The data input 112 also receives externally sourced data (e.g. updates from the mine operation 104, including for example sensor data describing one or more aspects of the mine operation such as current traffic conditions), and incorporates the externally sourced data into the global mine data provided to the various parts of the system 100.

The operating parameters and global mine data are provided to a flow planner 106 (also referred to herein as a "flow planner module") that determines one or more planned flow rates based on the operating parameters and the global mine data. Each of the one or more planned flow rates is a function of time over a flow planning window. In some embodiments, one or more of these planned flow rates vary as a function of time over the flow planning window.

The system 100 includes a dispatcher 108 (also referred to herein as a "dispatcher module") to which the planned flow rates are provided. The dispatcher 108 determines dispatch assignments based on the planned flow rates provided from the flow planner 106. The dispatcher determines dispatch assignments for a dispatch planning window. The dispatcher 108 then effects the dispatch of assets based on the dispatch assignments. The dispatcher 108 autonomously directs operation of the mining equipment. In some embodiments the dispatch of assets effects an actual flow rate that varies over time, for example in alignment with one or more varying planned flow rates.

The flow planning window stretches from a flow plan start time to a flow planning horizon. In some embodiments, the flow plan start time is the start of a shift, the flow planning horizon is the end of the shift, and the flow planning window spans the shift. For a 12-hour shift, the flow planning window would therefore be a 12-hour window. As described elsewhere herein, in other embodiments, the flow plan start time may be intrashift (i.e. some time within a shift). The flow planning horizon may be a time that is a shift length (e.g. 12 hours) after the flow plan start time, irrespective of when the flow plan start time is (i.e. at the start of the shift, or intrashift). The flow planning horizon may be less than a shift length after the flow plan start time (e.g. when planning for half a shift), or more than a shift length (e.g. when planning for two consecutive shifts).

The dispatch planning window stretches from a dispatch start time to the end of a dispatch planning horizon. The dispatch planning window is typically a moving window within the flow planning window. In some embodiments the dispatch planning horizon is a fixed time period, e.g. 10 minutes, 30 minutes or 1 hour. In other embodiments the dispatch planning horizon is dependent on the activities of the assets, for example the dispatch planning horizon may be approximately the same as a haul-cycle. Accordingly, the dispatch planning window is selected to be approximately equal to an "activity period". The activity periods are time periods that are based on the expected time to complete a certain type of activity, for example an activity period may be selected to be approximately the same length as (or slightly longer than) the longest haul-cycle. In some embodiments the activity periods utilised by the system 100 are variable and/or configurable, and in other embodiments the activity periods are a predefined time, e.g. 30 minutes or 1 hour. The dispatch planning window may include one or more activity periods so that not just the next decision is determined, but multiple steps for multiple assets are determined.

The components of the system 100 such as the flow planner 106, dispatcher 108, and estimator 110 may be implemented on a computing device or computing system, or on more than one computing system, the one or more computing systems may be networked computing systems. An exemplary computing system includes a processor, a program memory, and a data port. The processor, the program memory and the data port are connected together via a bus. The program memory is a non-transitory compute readable medium, such as a hard drive, a solid state disk or CD-ROM. A set of computer-executable instructions, that is, an executable software program stored on the program memory causes the processor to perform the methods described herein.

The computing systems of the flow planner 106, dispatcher 108 and the estimator 110 are in communication with one another and the mine operation database 124 via a communication network that can be any suitable network, such as a wireline network, a cellular communication network, a wireless local area network (WLAN), an optical communication network, etc. The communication network may be a combination of the suitable networks, for example, the Internet. The communication network can also be a private communication network that is built specifically for the asset assignment system.

In contrast to existing systems which typically consider only the current state of the mine when calculating the desired instantaneous flow rates of e.g. the shovels, the flow planner 106 described herein uses the global mine data to calculate desired flow rates over the flow planning window. Similarly, the dispatcher 108 also receives and applies the global mine data for determining the dispatch assignments.

The global mine data includes a variety of data describing the mine operation. In some embodiments the global mine data includes one or more of the following:
(i) historical data describing past activities in the mine operation 104,
(ii) current system operational data describing a current situation in the mine operation 104,
(iii) asset data describing the assets available for dispatch, and
(iv) future estimates that estimate future parameters and/or conditions relating to the mine operation 104.

Future estimates: Current system operational data is received from the mine operation 104 and stored in the mine operation database 124 (this data may be received in real-time, near real-time, in batches, etc., depending on how data is uploaded from the mine operation 104). The estimator 110 retrieves the historical data and/or the current system operational data and uses the retrieved data to determine the future estimates. The estimator 110 uses the historical data and/or the current system operational data for a detailed statistical analysis of operation, such as the distribution of travel or operation times for a specific vehicle, associated with one or more specific locations, and at a specific time.

In some embodiments the estimator 110 provides time-based statistics. For example, in some embodiments the estimator 110 determines and provides the future estimates in the form of activity duration estimates to the flow planner 106 and/or the dispatcher 108. The activity duration estimates may include a probability distribution for a given range of duration estimates. The flow planner 106 then determines planned flow rates informed by the activity duration estimates while the dispatcher 108 modifies the dispatch assignments based on the expected performance of assets as informed by the activity duration estimates.

Activity duration estimates describe the estimated duration of various activities associated with respective assets, for example the time taken for a vehicle to travel from source to destination, or the time taken for a haul truck to load or unload. In some embodiments these estimates may, for example, be in the form of a speed over time estimate if the vehicle is not expected to travel at a uniform speed. It will be understood that global mine data that is not specifically time-based can also be determined and/or communicated by the estimator 110.

Asset data: Data relating to one or more parameters that describe various characteristics of an individual asset or an asset class are stored on the mine operation database 124. This data is used to inform the scheduling systems (i.e. both the flow planner 106 and the dispatcher 108), and may relate to an individual asset, e.g. individual trucks, and/or to an asset class, e.g. fleets as a whole.

The dispatcher 108 retrieves data from the mine operation database 124 that describe the available assets that the dispatcher 108 considers using for achieving the planned flow rates. This enables the dispatcher 108 to take into consideration one or more parameters that describe various characteristics of an individual asset or an asset class. For example, for a haul system that has a heterogeneous fleet, not all vehicles are necessarily equally suited for each task, leading to preferences and constraints when assigning equipment and vehicles. Equipment may operate at different speeds depending on the equipment and the task, for example, vehicles may travel at different speeds depending on the vehicle type or their current cargo, e.g. a loaded vehicle may travel at a lower speed due to engine or safety constraints. The dispatcher 108 is able to take this into account by accessing data in the mine operation database 124 that describes an asset identified by an asset identifier (e.g. a particular haul truck), an asset class (e.g. data common to all the haul trucks in a fleet), and one or more asset descriptors (e.g. whether a truck is loaded or unloaded, or the particular truck's average speed when loaded or unloaded).

In some embodiments the estimator 110 utilises conditioning parameters in the form of performance or operational characteristics that describe an individual asset and/or an asset class, such as time taken to travel between locations or perform a particular task. This allows the estimator 110 to 'condition' a data query from the flow planner 106 or dispatcher 108 with respect to a particular conditioning parameter on particular subsets of the data, such as a model of haul truck, a specific vehicle (or combination of vehicles), operator, operational mode (manual vs. autonomous), current load, etc. depending on the data that is available. Accordingly, the estimator 110 is able to more precisely predict or measure the performance of a specific use-case, by estimating the performance based on similar historical situations.

Additionally, because the flow planner 106 uses the global mine data to determine the planned flow rates, the mine plan, knowledge of upcoming events, and data describing the current situation in the mine (that may include unexpected circumstances such as breakdowns or changing weather conditions) are all taken into consideration and one or more of these may be used as a conditioning parameter. In this way, planned events such as maintenance of shovels and trucks, road conditions or a blast which shuts down part of the mine, can be automatically accounted for by the system 100, for example by allowing automated planning for run-of-mine (ROM) stockpile levels to provide a buffer for expected downtimes. Planned events can therefore be accounted for without requiring a human operator to override the flow planner 106 when these events occur.

Similarly, using the global mine data allows the dispatcher 108 to consider the required planned flow rates and generate dispatch assignments according to a forward looking plan for how all assets (e.g. trucks, diggers, stockpiles, and crushers) will be utilised in order to achieve the required planned flow rates. For example, even though the road network may also be used by other vehicles that are not controlled by the dispatcher, whenever information about the planned path of such a vehicle is known, the dispatcher 108 can benefit from taking this into account in order to minimise delays. Because the dispatcher 108 takes the global mine data into consideration, the dispatcher 108 is able to proactively modify the dispatch assignments, as required, in order to achieve the required planned flow rates so that the plan is achieved.

In this way the global mine data are used to modify the dispatch assignments so as to align the dispatch of assets with the operating parameters. The word "align" is used herein, unless the context clearly indicates otherwise, as meaning to conform the dispatch assignments so that the mine operation operates as closely as possible to a defined goal. The defined goal may be (a) in the form of a primary goal as provided by production targets, (b) in the form of a modified goal as provided by the operating parameters with or without the global mine data, or (c) the goal may be in the form of a secondary goal in the form of planned flow rates or updated planned flow rates. Accordingly, the dispatch assignments are determined so as to align the dispatch of assets with the operating parameters and/or planned flow rates thereby achieving congruence between the plan and the operation.

The mining system 100 periodically updates the planned flow rates and/or the dispatch assignments. In addition, the global mine data may be updated periodically. Updated global mine data includes current system operational data that is received from the mine operation 104 in an ongoing fashion, for example in real-time, near real-time, or in batch updates. The updated global mine data may be real-time or near real-time data that includes a stream of sensor data describing current system operational data and/or asset data received from sensors in and/or associated with the mine operation. In addition in some embodiments, from updates of the current system operation data, the estimator 110 calculates and periodically updates one or more of the future estimates.

As used herein, unless the context clearly indicates otherwise, "periodically" means from time to time, and includes operations that are continual, continuous, regular, irregular, real-time, near real-time, batch operations, etc.

Referring again to FIG. 1A, feedback loops 120, 122 within the system 100 are used to implement the recalculating required for replanning the planned flow rates and the dispatch assignments. The flow planner 106 is periodically rerun to form a flow planner feedback loop 122 that provides updated planned flow rates. Similarly the dispatcher 108 has a dispatcher feedback loop 120 that updates the dispatch assignments.

In some embodiments, the replanning feedback loops 120, 122 are responsive to both dynamic inputs and fixed inputs. Dynamic inputs include factors that change over time such as global mine data that is updated periodically. Fixed inputs typically refer to operational constraints that do not change over time, and these may include one or more of the operating parameters that form part of the mine plan, e.g. production targets, or material movement targets.

A replanning loop around the flow planner 106 allows the system to automatically respond to major events, such as an unexpected break-down or road closure. This is illustrated by the flow planner feedback loop 122 in FIG. 1A. In order for the dispatcher 108 to sensibly assign trucks, the flow plan must be feasible, and so the flow planner 106 is re-run on a regular basis to ensure the overall flow plan is feasible, accounting for the current known constraints, equipment availabilities and material movement targets.

The flow planner 106 starts off determining the one or more planned flow rates over an initial flow plan window, such as a 12-hour shift. Periodically over this time, the flow planner updates the planned flow rates based on the updated global mine data. The updated planned flow rates are determined over a replanning flow plan window. The replanning flow plan window may have a decreasing horizon (i.e. what is left of the 12-hour shift), or the replanning flow plan window may have a receding horizon (i.e. for a further 12 hours). Accordingly, the length of the initial flow plan window and the length of one or more of the replanning flow plan windows may be different.

The flow planner 106 may replan and update the planned flow rates on a regular basis, e.g. every 5, 10 or 30 minutes. Alternatively, the flow planner 106 may be triggered to update the planned flow rates based on one or more trigger events, for example, at the end of one or more haul cycles, when deviations in mine operation occur (such as unexpected downtime and maintenance on equipment), when the dispatcher provides a trigger (e.g. if the current state of the mine becomes incompatible with the current dispatch assignments), etc.

Since the vehicle demand is constantly changing and furthermore influenced by unpredictable disturbances such as delays or break downs, the dispatcher 108 must react to unforeseen circumstances in real time. Thus, an approach that plans a long schedule off-line and merely executes it in real time is unsuitable for the haul fleet dispatching problem. Therefore the dispatcher 108 primarily aims at assigning trucks that require a task in the foreseeable future while taking into account future events as much as computational limits allow.

Accordingly, the dispatcher 108 provides a dispatcher feedback loop 120 around the planned flow rates and the actual flow rates achieved. This is illustrated by the dispatcher feedback loop 120 in FIG. 1A.

The dispatcher 108 updates the dispatch assignments based on any changes in the global mine data (e.g. in view of the current state of the mine), and/or based on any changes to the planned flow rates (e.g. if the planned flow rates have been updated by the flow planner 106). The dispatcher 108 recalculates the dispatch assignments to provide updated dispatch assignments so that the actual flow rates caused by the dispatch closely track the planned flow rates.

The dispatch planning window moves based on when the dispatcher 108 updates the dispatch assignments, and accordingly the dispatch planning window has a receding horizon. The dispatcher 108 periodically recalculates one or more of the dispatch assignments every time it runs, and this occurs based on a combination of at least one of the following:
(a) when the planned flow rates are updated when the flow planner replans;
(b) when the conditions in the mine change and the global mine data is updated;
(c) if the current state of the mine becomes incompatible with the dispatch plan required to achieve one or more planned flow rates (e.g. if a truck is no longer in the right sequence or on the right road to its destination);
(d) after a defined time period has passed (e.g. anything between about 20 seconds and 1 hour);
(e) at every decision point (or every N decision points, e.g. every 2, 5 or 10 decision points) in an asset deployment (e.g. when a truck reaches or is approaching an intersection/end-point); and
(f) when as asset completes, or has almost completed, its current assignment (e.g. a truck approaching an intersection/end-point).

In some embodiments, for example where the dispatcher 108 updates a dispatch assignment up to the end of a predefined time (e.g. the end of a shift), the dispatch planning window may have a decreasing horizon determined by the predefined time.

The dispatcher 108 thus repeatedly evaluates where and how equipment should be allocated in order to meet the end goals of the day or shift. The intended behavioural effect of this is automatic reprioritisation of the load-haul fleet to ensure that the material moved eventually meets the planned flow rate, despite any disruptions or performance mismatches in the system. This results in the dispatcher 108 providing improved performance in comparison to existing commercial scheduling systems used for dispatching, in particular with respect to both planned and unplanned discrete events that change the environment that they are executed in (e.g. maintenance, breakdowns). Typical existing systems are based on open-loop control systems, requiring an operator to adjust the flow rates manually, for example by adjusting configuration parameters to make any required corrections. Existing systems typically perform local optimisation, for example optimising truck performance for maximum material flow rate, rather than doing just enough to satisfy the target set for them, which in turn is a target that is set to achieve the overall plan.

For the system 100 described herein, an operator does not need to constantly intervene and re-calculate configuration parameters in order to achieve the plan of the day. In existing systems, the operator can typically only specify instantaneous flow rates for diggers, with the scheduling system effectively running the plan 'open loop' as it tries to match the current flow rate, not the cumulative target. The system and methods described herein result in the dispatcher 108 effectively following a defined cumulative flow target so that an operator acting as the feedback in the control loop is not required.

The flow planner 106 determines planned flow rates over time based on operating parameters defined in the mine plan, and based on global mine data that describe the mine operation and relevant assets. Both the operating parameters and the global mine data contribute to defining the goals to be achieved, and the flow planner 106 determines the planned flow rates by optimising for the goals, for example using a linear programming method.

In a first exemplary embodiment, the operating parameters include cost-related parameters. The cost-related parameters may be, for example, a mathematical cost function representing an actual operating costs (e.g. the cost of operating a truck, processing plant, crusher, etc.) or a mathematical cost function defined to model one or more operational objectives. Accordingly, the flow planner 106 determines the planned flow rates by also optimising the cost-related parameters so that the flow planner 106 plans the material flow rates in order to execute a given plan at a minimum cost.

In this first exemplary embodiment, the objective of the flow planner 106 is selected in order to minimise equipment operating costs, equipment underutilisation costs, and plan failure costs. The equipment operating costs considered in this example are the truck operating costs. The truck operating costs are modelled as a cost per unit time of operation per truck. In some embodiments, the operating costs are split into loaded and unloaded travel times, dumping and loading times. In some embodiments, the truck operating costs are also based on road distance and grade. The equipment underutilisation costs are based on the crusher cost. The crusher cost is incurred when a crusher is forced to operate below the desired speed due to insufficient material flow. The plan failure cost component models the revenue lost due to not meeting the operating parameters of the flow plan. Different combinations of material blocks and target destinations can have different plan failure costs, enabling desired aspects of the plan to be prioritised.

In one embodiment, the flow planner 106 uses a linear programming method and splits the flow plan into a number of discrete time periods, such as activity periods that are based on the expected time to complete a certain type of activity. The length of each time period is determined by the timing of the planned activities, as changes in the flow rates are only expected in response to planned events. This approach is relatively fast and is able to successfully plan for expected events, for example building up a ROM stockpile to continue feeding the crusher when High Grade (HG) diggers, or shovels, are shut down due to a blast.

In another embodiment, a mixed-integer linear programming (MILP) method is used that incorporates the concept of blocks of ore. A shovel may dig multiple blocks throughout a shift, and each block will have different ore content properties and therefore different destinations. Thus, considering the individual blocks facilitates calculating the flow rates correctly.

In the exemplary embodiment, described in detail here, a MILP method is used. The planned flow rates are determined by optimising a goal, referred to here as an "objective function". Both the operating parameters and the global mine data contribute to defining the objective function. Typically, and in this exemplary embodiment, the goal includes minimising a cost function.

Figure 2:
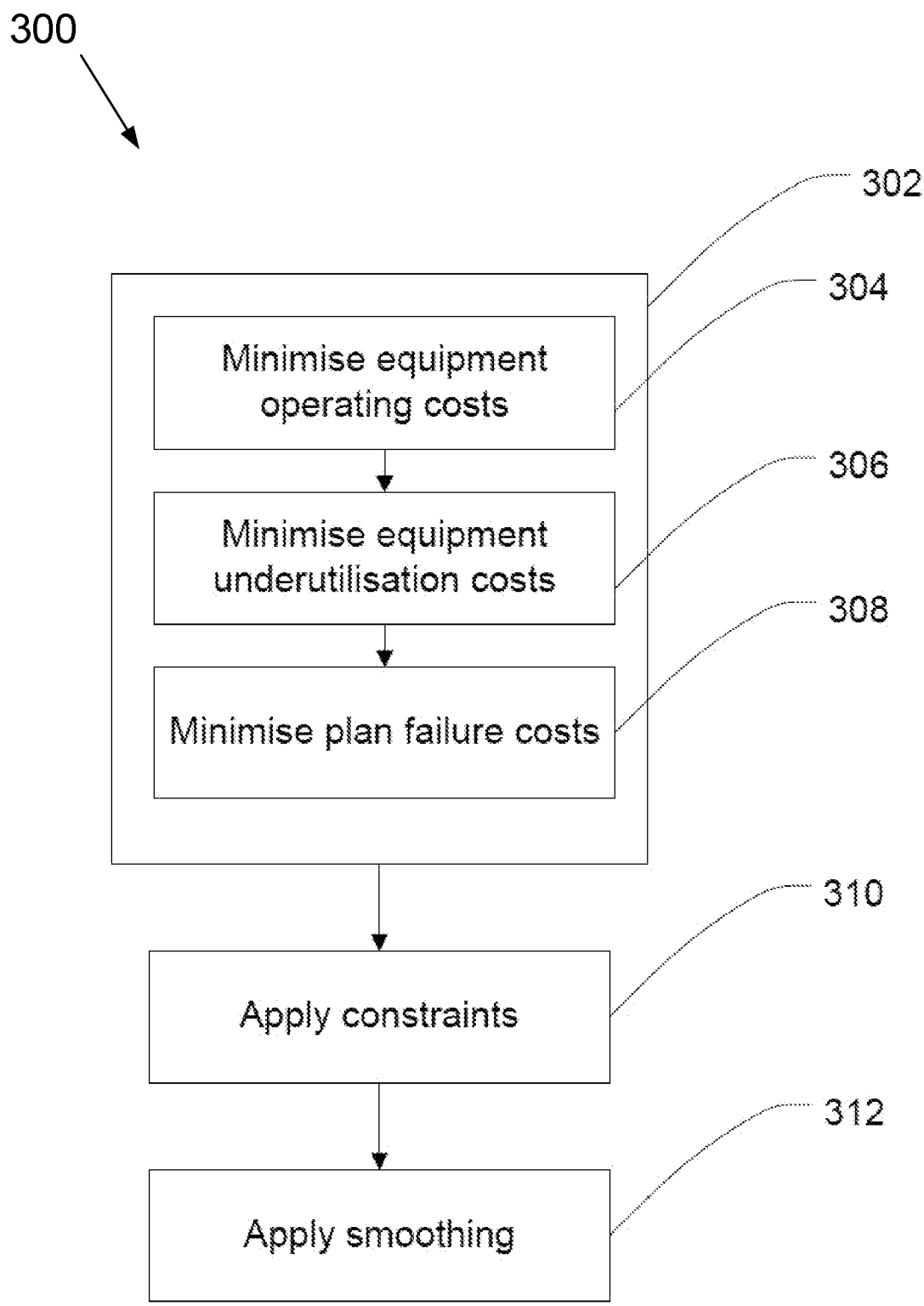
FIG. 2 is a diagrammatic representation of an embodiment of a flow planning method.

The optimisation problem that is solved by this exemplary flow planner 106 to determine the planned flow rates can be expressed as (1) minimising a selected objective function, (2) subject to the relevant constraints. Referring to FIG. 2 of the drawings, a method 300 of determining planned flow rates includes optimising an objective function 302 by minimising costs of the operation. In the exemplary embodiment, the objective function includes minimising equipment operating costs 304, minimising equipment underutilisation costs 306, and minimising plan failure costs 308. Optimising 302 is performed subject to the application of constraints 310.

The objective function in this example is a combination of the plan failure cost, crusher cost, and truck operating cost. For each element, the cost coefficients are $/unit volume (or material mass) for the plan failure and crusher costs, and $/unit time for the truck operating cost. The truck operating cost is calculated by multiplying the total capacity of each truck required in each time period by the length of the time period and the operating cost per truck per hour, and dividing by the capacity of the truck type. The calculation of the total capacity of each truck required is split into three components: the first is based on the time taken for the truck to be loaded at a shovel and then travel to a dump, the second is the time taken for the truck to unload at a dump and then travel to a shovel, and the final is a special case for the routes from the ROM shovel to the dumps.

An exemplary objective function is as follows:

$$J_1 = \sum_{b \in B, i \in D} \psi_{b,i} p_{b,i} + \sum_{t \in T, i \in C} \pi_i \tau_t f_{t,i} +$$
$$\sum_{t \in T, \theta \in \Theta} \frac{\tau_t c_\theta}{\phi_\theta} \Bigg( \sum_{i \in B, j \in N_i} y_{t,\theta,i,j}(\beta_{s_i,\theta} + \alpha_{t,\theta,i,j}) +$$
$$\sum_{i \in D, j \in N_i} y_{t,\theta,i,j}(d_{\theta,i} + \alpha_{t,\theta,i,j}) + \sum_{i \in Q, j \in N_i, b \in B} y_{t,\theta,i,j,b}(\beta_{s_i,\theta} + \alpha_{t,\theta,i,j}) \Bigg)$$

with parameters defined as follows:

$\tau_t$ length of time period $t \in T$ $c_\theta$ operating cost per unit time of truck type $\theta \in \Theta$ $\phi_\theta$ capacity of truck type $\theta \in \Theta$ $\gamma_{t,\theta}$ total capacity of truck type $\theta \in \Theta$ available in time period $t \in T$ $\alpha_{t,\theta,i,j}$ travel time of truck type $\theta \in \Theta$ from location $i \in L$ location $j \in L$ in time period $t \in T$ $d_{\theta,i}$ time taken for truck type $\Theta \in \Theta$ to dump at location $i \in D$ $\beta_{s,\theta}$ time taken for shovel $s \in S$ to load truck type $\theta \in \Theta$ $\pi_i$ low feed cost of crusher $i \in C$ $\psi_{b,i}$ cost per unit volume under plan of material $b \in B$ at dump $i \in D$ $s_i$ shovel allocated to block $i \in B$ or ROM shovel location $i \in Q$ $\eta_i$ ROM shovel location associated with ROM stockpile $i \in R$ $m_{s,t}$ maximum digging rate of shovel $s \in S$ in time period $t \in T$ $k_{t,i}$ maximum flow rate into dump $i \in D$ in time period $t \in T$ $e_{t,i}$ minimum desired flow rate into crusher $i \in C$ in time period $t \in T$ $a_b$ initial volume of material in block $b \in B$ $g_{i,b}$ initial volume of material from block $b \in B$ at dump $i \in D$ $h_{i,b}$ desired volume of material from block $b \in B$ at clump $i \in D$ at the end of the plan $\omega_b$ the block that must be completed before $b \in B$ $\delta_b$ number of time periods taken for the shovel to transition to block $b \in B$ from $\omega_b$. If $\omega_b$ does not exist, then this is the number of time periods from the start of the schedule before shovel can begin digging block $b \in B$ $r_b$ maximum ratio that block $b \in \Phi$ that contains sticky material can be fed into a crusher in proportion to the total material flow into the crusher, $0 < r_b \leq 1$ As is typical for optimisation problems, the cost objectives are optimised subject to a number of constraints, such as flow continuity at each location, maximum shovel digging rates, minimum and maximum dump flow rates, initial dump levels, ore blending requirements at the crusher, number of trucks, and planned asset availability.

Some of the constraints used for this exemplary embodiment are similar to the constraints used in existing commercial packages, such as the flow continuity, maximum digging rate of each shovel, the maximum flow rates into the dumps, and the total number of trucks. One difference for the flow planner 106 described herein is in the planned asset availability, where the asset may refer to any equipment assigned to the operation, for example trucks, shovels, stockpiles, crushers, roads, etc.

A number of exemplary constraints are described here.

The first two constraints enforce flow continuity; that is, the sum of the flow rates going into a location is equal to the sum of the flow rates leaving a location, described as follows:

$$\sum_{j \in M_i \setminus Q} y_{t,\theta,j,i} + \sum_{j \in M_i \cap Q, b \in B} y_{t,\theta,i,j,b} = \sum_{j \in N_i} y_{t,\theta,i,j} \forall t \in T, \theta \in \Theta, i \in L \setminus Q$$

$$\sum_{j \in M_i} y_{t,\theta,j,i} = \sum_{j \in N_i, b \in B} y_{t,\theta,i,j,b} \forall t \in T, \theta \in \Theta, i \in Q$$

The maximum digging rate of a shovel is dependent on the time period. In this way, planned maintenance of the shovel can be incorporated by setting the maximum digging rate of the shovel to 0 in the time periods where it is planned to have maintenance performed on it. The maximum digging rate takes into account time needed for cleaning up and other incidental tasks, and is not the theoretical maximum digging rate of the shovel. The maximum digging rate is multiplied by a binary variable indicating whether the block is being dug in a time period to take into account that only one block can be dug by a shovel at a time.

The constraint for maximum digging rate for non-ROM shovels is described as follows:

$$\sum_{\theta \in \Theta, j \in N_i} y_{t,\theta,i,j} \leq x_{t,i} m_{s_i,t} \forall\, t \in T,\, i \in B$$

The constraint for maximum digging rate for ROM shovels is described as follows:

$$\sum_{\theta \in \Theta, j \in N_i, b \in B} y_{t,\theta,i,j,b} \leq m_{s_i,t} \forall\, t \in T,\, i \in Q$$

The maximum flow rate may be specified for some types of dumps (for example a limit on the maximum flow rate into a crusher). In some embodiments the maximum flow rate for other types of dumps is calculated from the time taken for a truck to unload at the dump, giving the maximum number of trucks that can be serviced per unit of time. This constraint ensures that the maximum flow rate into a dump is not exceeded. This is described as follows:

$$\sum_{\theta \in \Theta, j \in M_i \setminus Q} y_{t,\theta,i,j} + \sum_{\theta \in \Theta, j \in M_i \cap Q} y_{t,\theta,i,j,b} \leq k_{t,i} \forall\, t \in T,\, i \in D$$

The extent to which a crusher is operating below its desired minimum flow rate and for which it is penalised is governed by an objective function as follows:

$$f_{t,i} \geq e_{t,i} - \sum_{\theta \in \Theta, j \in M_i \setminus Q} y_{t,\theta,j,i} - \sum_{\theta \in \Theta, j \in M_i \cap Q} y_{t,\theta,j,i,b} \forall\, t \in T,\, i \in C$$

The total available capacity of each truck type can vary between time periods as trucks are removed from the fleet for maintenance, refuelling, shift changes, and breaks. The total capacity of each truck type being used is constrained to not exceed the total capacity available:

$$\sum_{i \in B, j \in N_i} y_{t,\theta,i,j}(\beta_{s_i,\theta} + \alpha_{t,\theta,i,j}) + \sum_{i \in D, j \in N_i} y_{t,\theta,i,j}(d_{\theta,j} + \alpha_{t,\theta,i,j}) +$$

$$\sum_{i \in Q, j \in N_i, b \in B} y_{t,\theta,i,j,b}(\beta_{s_i,\theta} + \alpha_{t,\theta,i,j}) \leq \gamma_{t,\theta} \forall\, t \in T,\, \theta \in \Theta$$

The volume of material initially in a block is determined and then calculated for each time period:

$$v_{-1,i} = a_i \forall\, i \in B$$

$$v_{t,i} = v_{t-1,i} - \tau_t \sum_{\theta \in \Theta, j \in N_i} y_{t,\theta,i,j} \forall\, t \in T,\, i \in B$$

For initial dump levels, the volume of each type of material that is at each dump is initialised and then calculated in each time period by integrating the incoming flow rates over time:

$$l_{-1,i,b} = g_{i,b} \forall\, i \in D,\, b \in B$$

$$l_{t,i,b} = l_{t-1,i,b} + \tau_t \left( \sum_{\theta \in \Theta} y_{t,\theta,b,i} + \sum_{\theta \in \Theta, j \in M_i \cap Q} y_{t,\theta,j,i,b} \right) \forall\, t \in T,\, i \in D \setminus R,\, b \in B$$

$$l_{t,i,b} = l_{t-1,i,b} + \tau_t \left( \sum_{\theta \in \Theta} y_{t,\theta,b,i} - \sum_{\theta \in \Theta, j \in N_{y_i}} y_{t,\theta,s_{n_i},j,b} \right) \forall\, t \in T,\, i \in R,\, b \in B$$

For ROM stockpiles, the outgoing flow rates from the associated shovel are also incorporated. It is assumed that ROM stockpiles will not receive material from ROM shovels.

The level of conformance with the plan is calculated as follows:

$$p_{t,b} \geq h_{i,b} - l_{t_{max},t,b} \forall\, b \in B,\, i \in D$$

For certain plan failure cost and crusher cost coefficients in scenarios where it is not possible to keep the feed to the crusher above the minimum desired rate using the material specified for the crusher in the plan, the crusher may be fed with waste material. This may occur where the crusher costs are significantly higher than the plan failure costs. However, to prevent this from occurring, an additional constraint is used to ensure that only the material specified for each dump in the plan is dumped there:

$$l_{t_{max},t,b} \geq h_{i,b} \forall\, b \in B,\, i \in D$$

Constraints are used to enforce that each block of material must be excavated in one go by a shovel, i.e. a shovel cannot start excavating a block before finishing the previous block:

$$\sum_{t \in T} x^s_{t,b} \leq 1 \forall\, b \in B$$

$$\sum_{t \in T} x^f_{t,b} \leq 1 \forall\, b \in B$$

$$\sum_{b \in \Gamma_s} x_{t,b} \leq 1 \forall\, t \in T,\, s \in S$$

$$x_{t,b} = x_{t-1,b} + x^s_{t,b} - x^f_{t,b} \forall\, t \in T,\, b \in B$$

$$x_{-1,b} = 0 \forall\, b \in B$$

Constraints are used to ensure that blocks are removed in the order specified by the plan, and that the time taken to move the shovel from one block to another (if any) is incorporated:

$$x_{t,b}^s = x_{t-\delta_b, \omega_b} \forall\, t \in T \setminus \{0, \ldots, \delta_b - 1\},\, b \in B \text{ if } \omega_b \text{ exists}$$

$$x_{t,b}^s = 0 \forall\, t \in \{0, \ldots, \delta_b - 1\},\, b \in B$$

If a block does not have a specified previous or preceding block, then it must be the first block allocated to the shovel. A constraint is used to force the entire volume of the block to be removed before it can be marked as finished:

$$a_b x_{t,b}^f \leq a_b - v_{t,b} \forall\, t \in T,\, b \in B$$

A constraint is used to deal with material that must be fed into the crusher in a specified proportion:

$$\sum_{\theta\in\Theta,b\in\Phi}\frac{y_{t,\theta,b,i}}{r_b}+\sum_{\theta\in\Theta,b\in\Phi,j\in Q}\frac{y_{t,\theta,j,i,b}}{r_b}\leq \sum_{\theta\in\Theta,b\in B}y_{t,\theta,b,i}+\sum_{\theta\in\Theta,b\in B,j\in Q}y_{t,\theta,j,i,b}\ \forall\ t\in T,\ i\in C$$

This primarily arises from sticky material that can block the crusher if too much is fed through at once. Accordingly, a maximum ratio of the sticky material to non-sticky material in each time period is defined.

This model can be cast as a MILP and solved using commercial software packages such as Gurobi™. As an example, for a mine with 5 shovels, 1 crusher, 1 waste stockpile, 1 ROM stockpile, and 6 blocks of material, Gurobi is able to solve the model in approximately 0.5 s on a laptop with an i7-4810MQ and 16 GB of RAM.

Figure 3A:
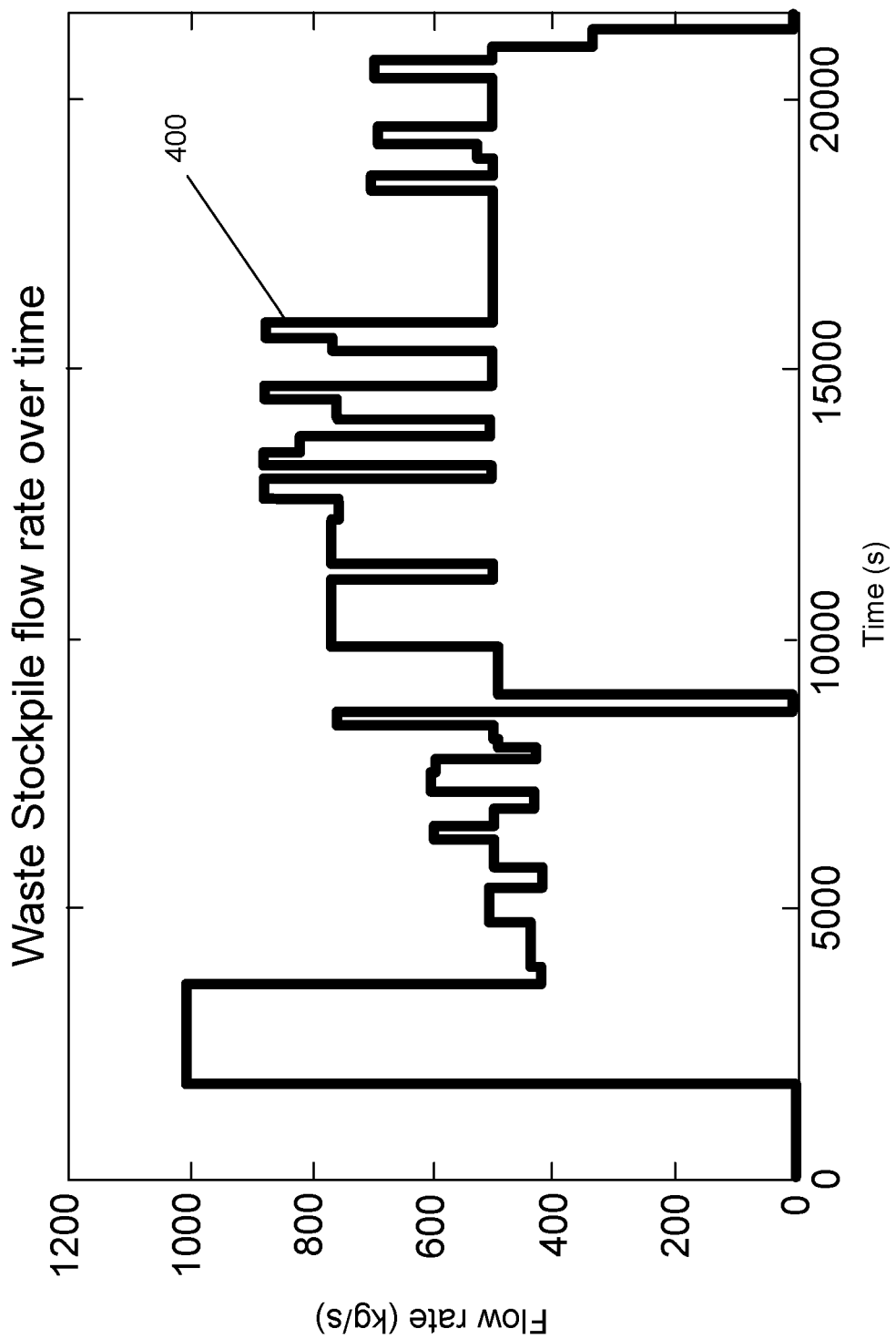
FIG. 3(a) illustrates a planned flow rate that is not smoothed.
Figure 3B:
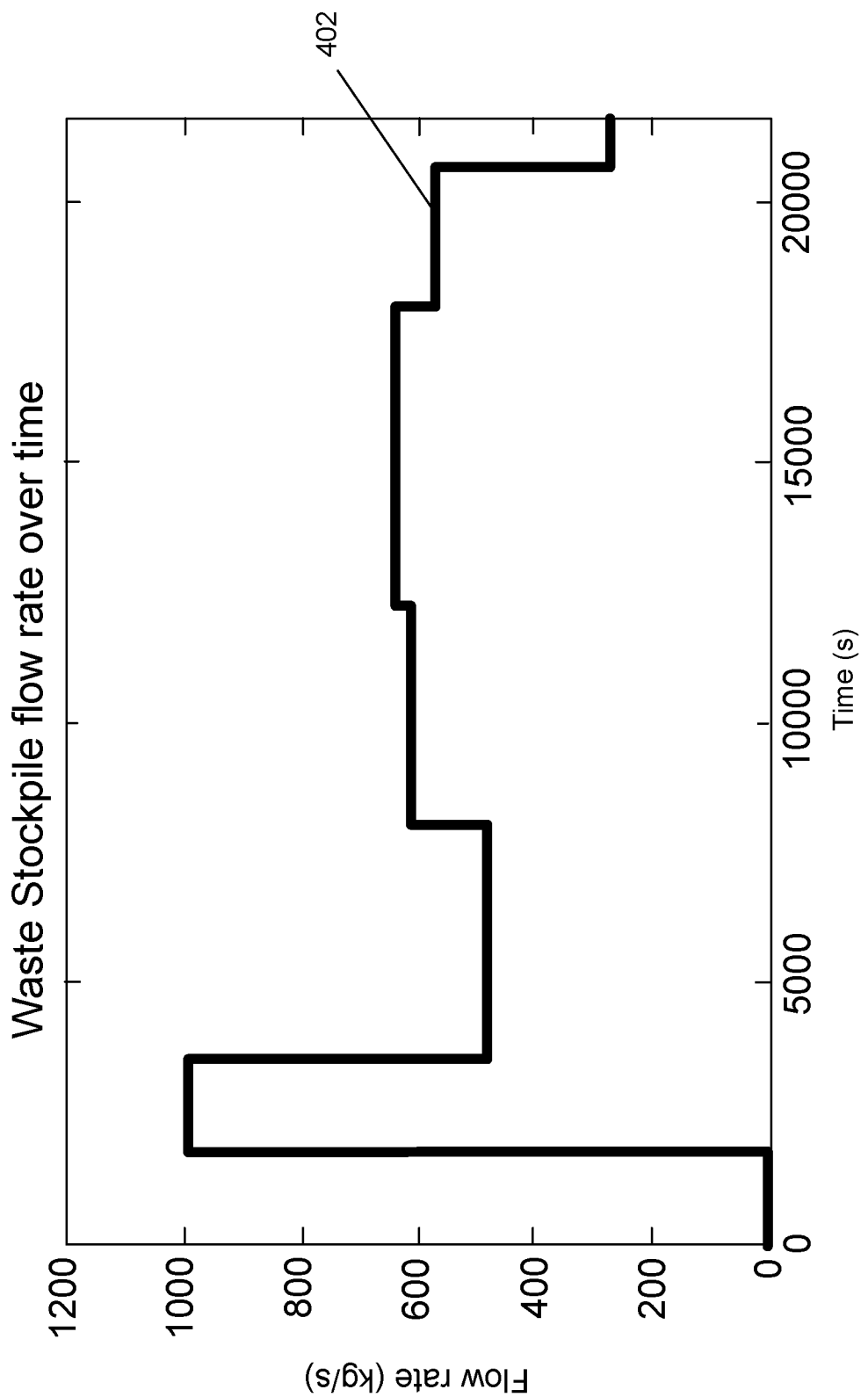
FIG. 3(b) illustrates a planned flow rate that is averaged between event times.
Figure 3C:
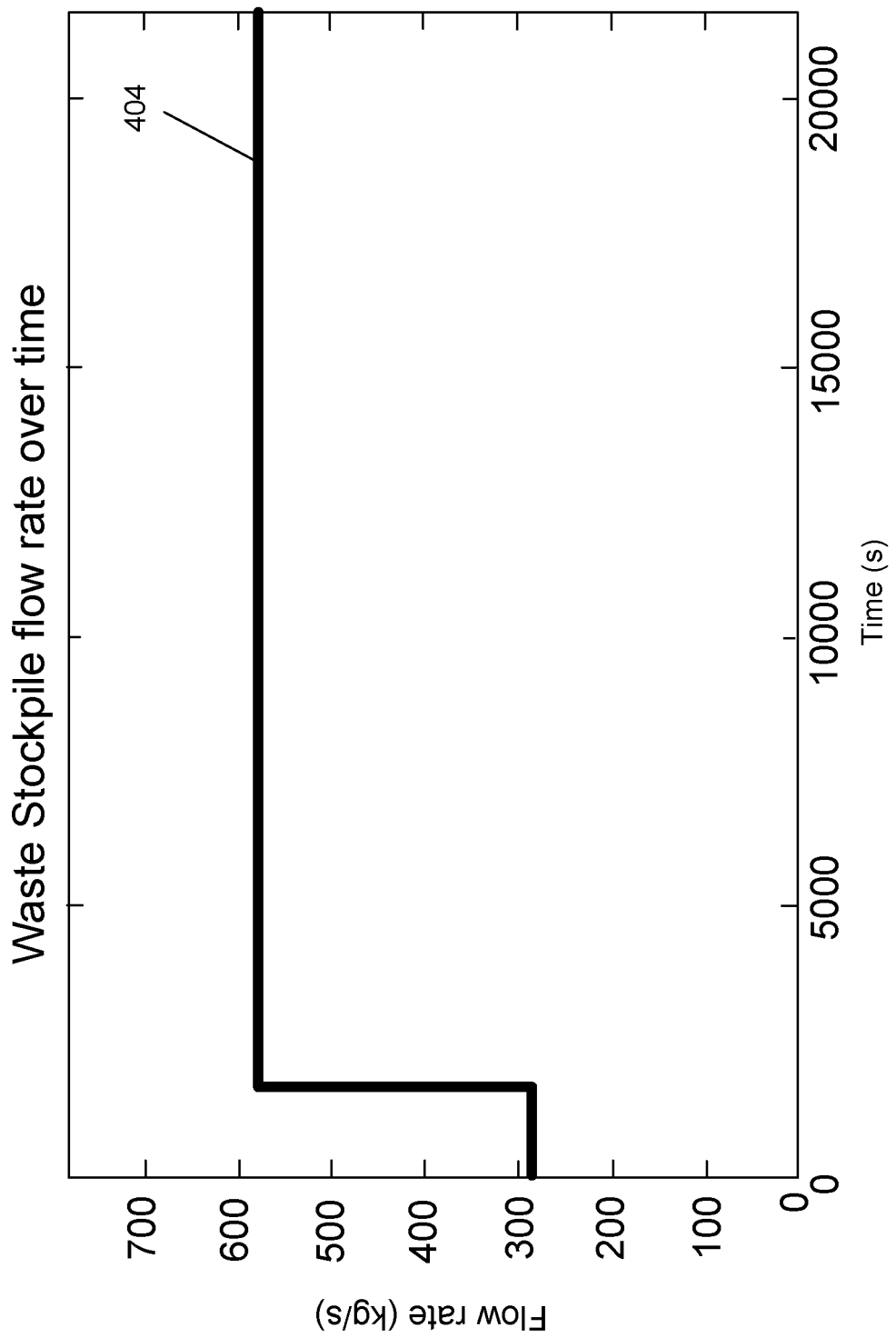
FIG. 3(c) illustrates a planned flow rate smoothed using a smoothing objective function.

The resultant planned flow rates can be erratic. An example of these jagged flow rates 400 is shown in FIG. 3(*a*). Frequent changes in the flow rates are undesirable as they make it difficult for human operators to understand and predict the behaviour of the system, and frequent changes make it difficult for the dispatcher 108 to actually achieve the planned flow rates. For this reason some embodiments may optionally include the application of smoothing 312, as shown in FIG. 2.

In one embodiment the planned flow rates are smoothed using averaging in which the magnitudes of each planned flow rate are averaged across multiple time periods. In an exemplary embodiment this is done using a moving average. However, using a moving average could result in planned flow rates that violate one or more of the constraints, particularly around points in time where shovels go down for maintenance.

In another embodiment, the times at which events occur are first identified. These times are when a block is started or finished, or when the availability of the assets changes. Then the magnitudes of each relevant planned flow rate between those event times are averaged. As the model is linear and there are no changes in the constraints between these event times, the resultant averaged planned flow rates satisfy the constraints. An example of a resultant smoothed planned flow rate 402 using this approach is shown in FIG. 3(*b*).

In another embodiment an additional component is added to the objective function to penalise changes in planned flow rates between successive periods. Two types of penalties may be used: (1) a binary penalty that penalises the number of changes in a flow rate, regardless of the magnitude, and/or (2) a continuous penalty that penalises the magnitude of the changes in the flow rate.

The binary penalty terms introduce additional binary variables to the model which may result in an increase to the computation time of the model. Although typically not as much, the continuous penalty may also lead to an increase in computation time. A consequence of using a continuous penalty is that combining the penalty terms with the original objective function may result in the original objectives being sacrificed for smoother flow rates.

In another embodiment, a separate model is used to post-process the result of the original, or first, objective function. An additional, or second, objective function is used for the smoothing model and is the sum of the flow differences, i.e. the difference in the magnitude of a planned flow rate between two successive time periods (defined in units of time) for a certain truck type from a source to a destination location, and the difference in the magnitude of a planned flow rate between two successive time periods for a certain truck type from a source to a destination location for a certain material type:

$$J_2=\sum_{t\in T\setminus\{0\},\theta\in\Theta}\left(\sum_{i\in L\setminus Q,j\in N_i}\zeta_{t,\theta,i,j}+\sum_{i\in Q,j\in N_i,b\in B}\zeta_{t,\theta,i,j,b}\right)$$

The following decision variables and parameters are used:

$\zeta_{t,\theta,i,j}\in\mathbb{R}_{\geq 0}$ difference in flow rate between time period $t\in T/\{0\}$ and $t-1$ for truck type $\theta\in\Theta$ from location $i\in L\setminus Q$ to location $j\in N_i$ $\zeta_{t,\theta,i,j,b}\in\mathbb{R}_{\geq 0}$ difference in flow rate between time period $t\in T/\{0\}$ and $t-1$ for truck type $\theta\in\Theta$ from location $i\in Q$ to location $j\in N_i$ of material type $b\in B$ $\lambda$ objective value of solution to $P_1$ $\chi_{t,b}$ the value of $x_{t,b}$ from the solution to $P_1$ for $t\in T$ and $b\in B$ $\chi_{t,b}^s$ the value of $x_{t,b}$ from the solution to $P_1$ for $t\in T$ and $b\in B$ $\chi_{t,b}^f$ the value of $x_{t,b}^f$ from the solution to $P_1$ for $t\in T$ and $b\in B$ The objective function is constrained by the magnitude of change in a planned flow rate between successive time periods defined in units of time (such as for every 1000 seconds, as an example):

$$\zeta_{t,\theta,i,j}\geq y_{t,\theta,i,j}-y_{t-1,\theta,i,j}\forall t\in T\setminus\{0\},\theta\in\Theta,i\in L\setminus Q,j\in N_i$$

$$\zeta_{t,\theta,i,j}\geq y_{t-1,\theta,i,j}-y_{t,\theta,i,j}\forall t\in T\setminus\{0\},\theta\in\Theta,i\in L\setminus Q,j\in N_i$$

$$\zeta_{t,\theta,i,j,b}\geq y_{t,\theta,i,j,b}-y_{t-1,\theta,i,j,b}\forall t\in T\setminus\{0\},\theta\in\Theta,i\in Q,j\in N_i,b\in B$$

$$\zeta_{t,\theta,i,j,b}\geq y_{t-1,\theta,i,j,b}-y_{t,\theta,i,j,b}\forall t\in T\setminus\{0\},\theta\in\Theta,i\in Q,j\in N_i,b\in B$$

Accordingly, the flow planner smooths the determined planned flow rate by reducing a magnitude of change in a planned flow rate between successive units of time. This approach avoids impacting the original objective function.

Additional constraints may be included to reduce the computational time to solve the model. For example, a first additional constraint removes the choice of when each block should start being excavated, allowing the solver to significantly reduce the number of binary variables in the problem:

$$x_{t,b}^s=\chi_{t,b}^s\forall t\in T,b\in B$$

An exemplary smoother planned flow rate 404 calculated using such a constraint together with the smoothing model is shown in FIG. 3(*c*).

In some embodiments, one or more second additional constraints that limit the level of impurities of the ore at the crusher are used for mines where the impurity levels must be kept below a limit for the processing plant to operate effectively.

The operation of the flow planner 106 described above may be understood with reference to FIG. 4 which shows a set of 8 planned flow rates, of which only one (FIG. 4(*d*)) is a steady state planned flow rate, while the other 7 all vary over time in a piecewise constant manner.

Figure 4B:
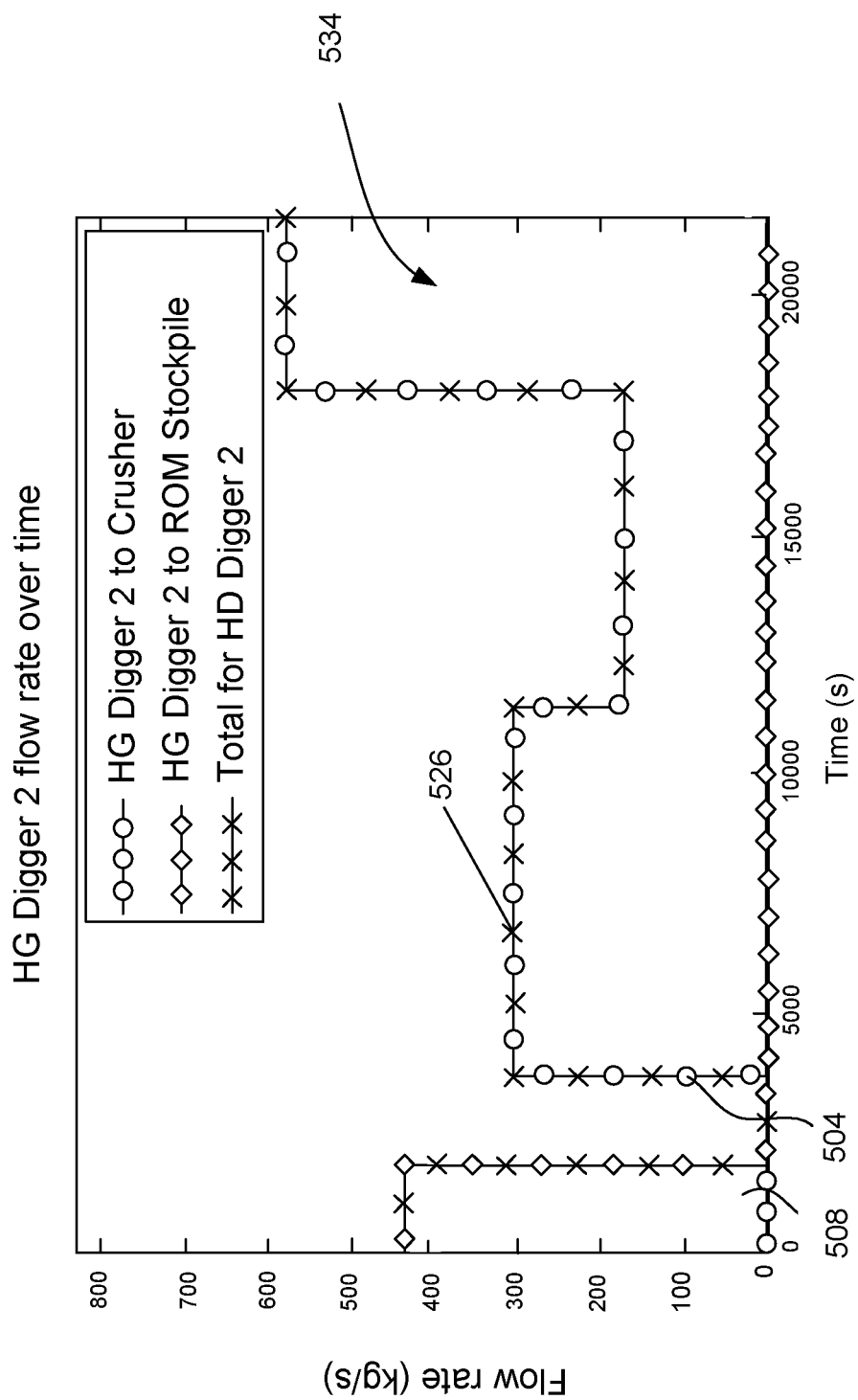
FIG. 4(b) illustrates the flow rates for example HG Digger 2.
Figure 4D:
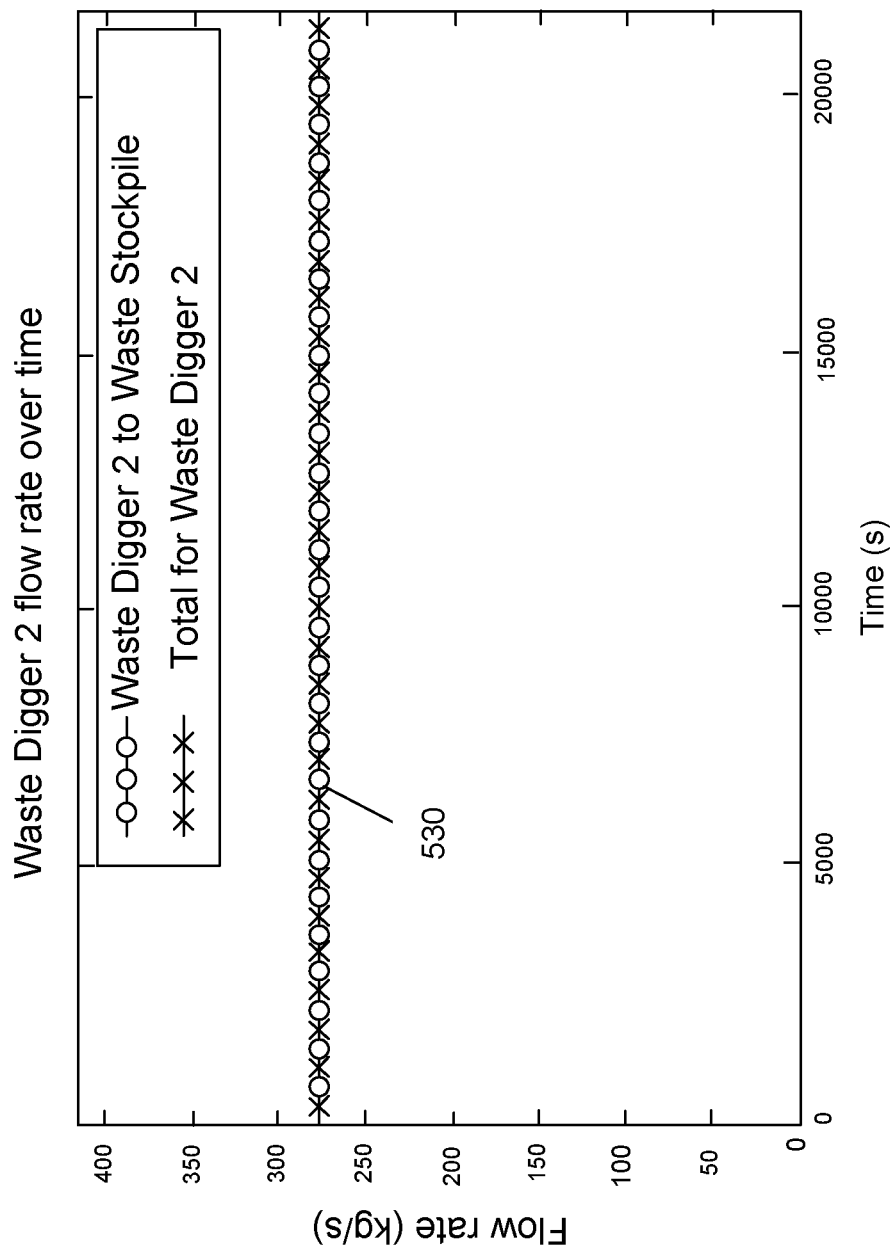
FIG. 4(d) illustrates the flow rate from example Waste Digger 2 to the waste stockpile.
Figure 4E:
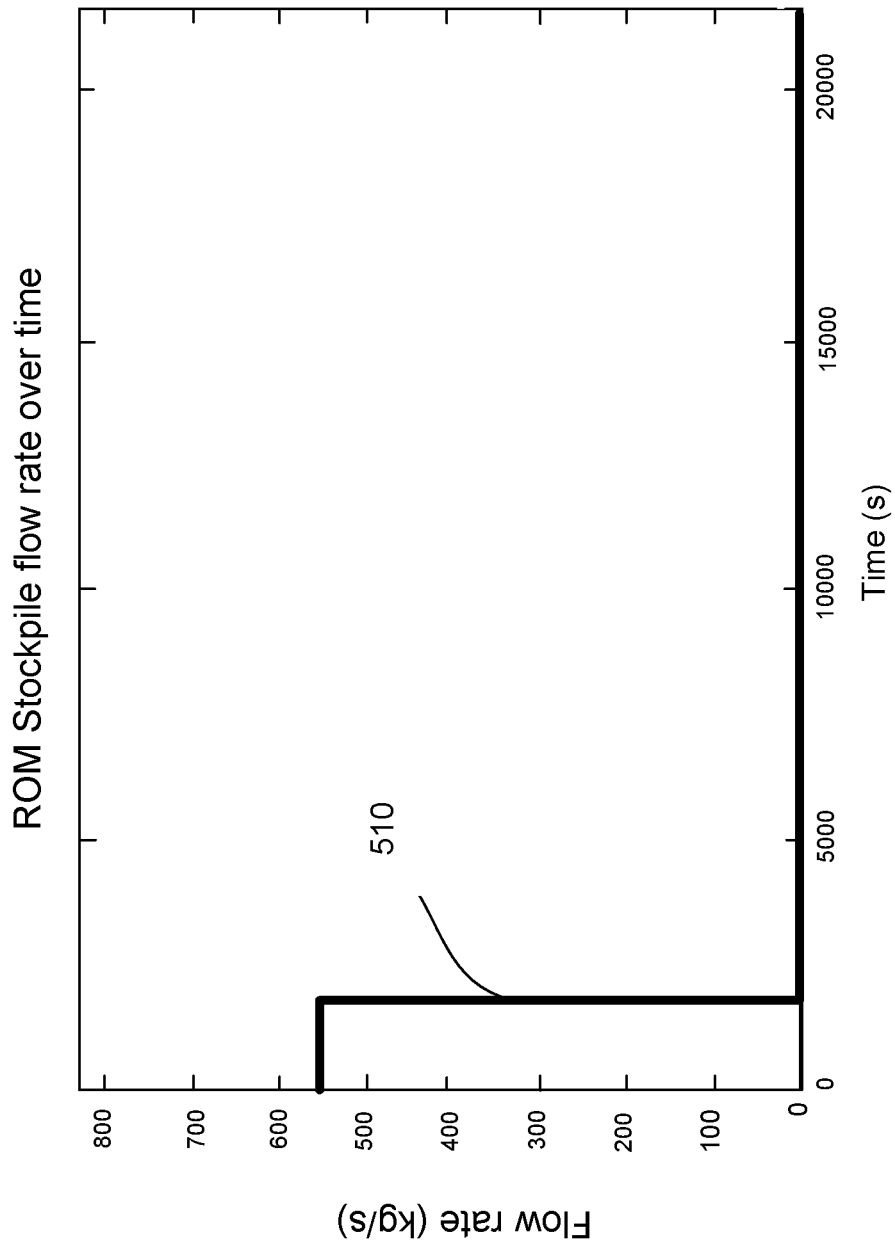
FIG. 4(e) illustrates a run-of-mine (ROM) stockpile flow rate.
Figure 4F:
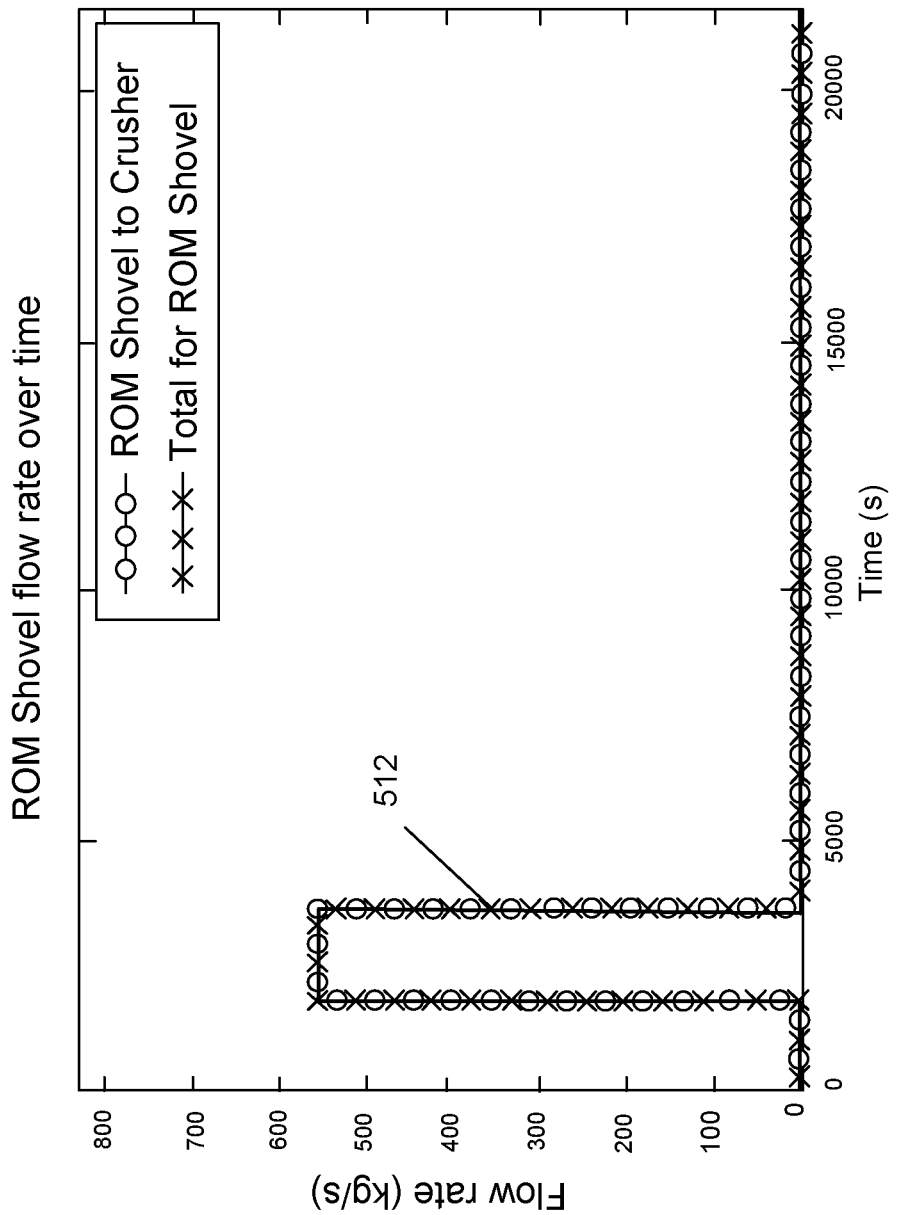
FIG. 4(f) illustrates a ROM shovel flow rate over time.
Figure 4G:
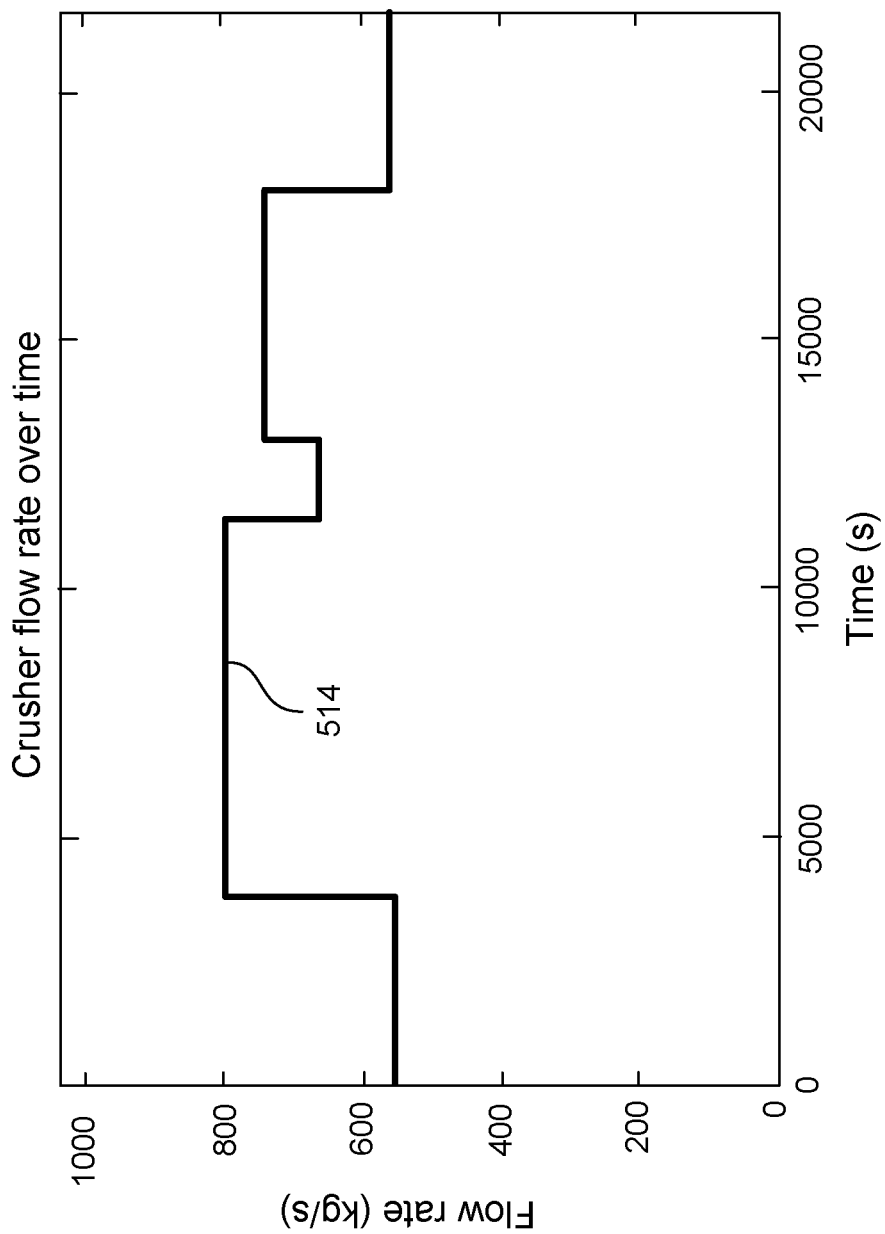
FIG. 4(g) illustrates a crusher flow rate.
Figure 4H:
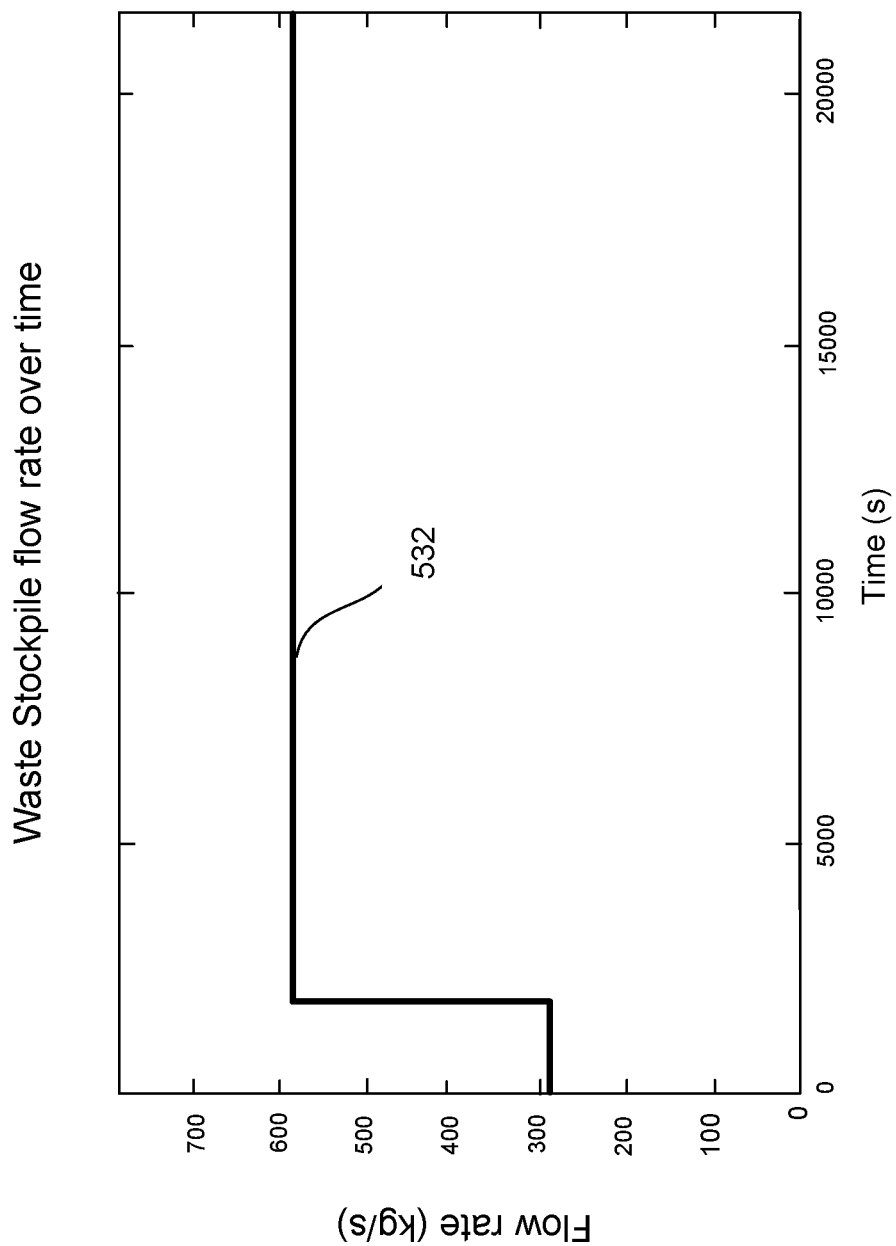
FIG. 4(h) illustrates a waste stockpile flow rate.
Figure 5:
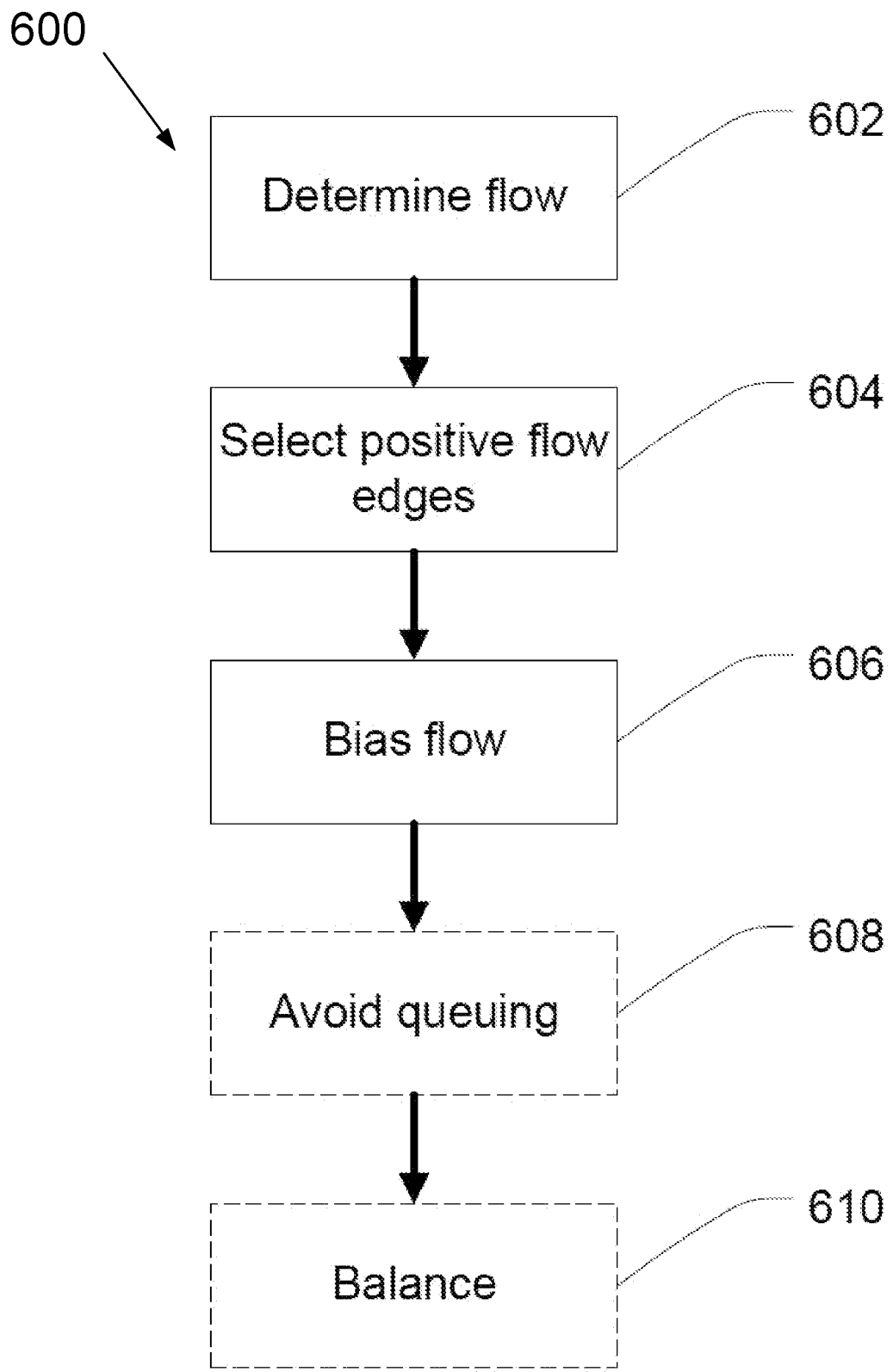
FIG. 5 is a schematic representation illustrating the use of a heuristic rollout function in an embodiment of an MCTS dispatcher.

In the example illustrated, the mine has 5 diggers: 2 HG diggers (FIG. 4(*a*) and FIG. 5(*b*)), 2 waste diggers (FIG. 4(*c*) and FIG. 4(*d*)), and 1 ROM digger (FIG. 4(*f*)), 6 blocks of material (2 for each of the HG diggers, and 1 for each of the waste diggers), a ROM stockpile (FIG. 4(e)), a waste stockpile (FIG. 4(h)), and a crusher (FIG. 4(g)). All of the material from the HG diggers go to the crusher, and all of the material from the waste diggers go to the waste stockpile. In this example the length of time considered is 6 hours, with a time period length of 5 minutes. Half an hour into the scenario, the two HG diggers are shut down for half an hour due to a planned blast in the mine. For the last hour of the scenario, HG Digger 1 is shut down due to planned maintenance.

The flow planner 106 calculates the planned flow rates by first solving the original objective function, followed by the smoothing model using the first additional constraint. FIG. 4(a) shows the planned flow rate (in kg/s) over time (in s) for HG Digger 1. The planned flow rate to the crusher 520, the planned flow rate to the ROM stockpile 522, and the total planned flow rate 524 are shown. Similarly, FIG. 4(b) shows the planned flow rates 526 for HG Digger 2. The planned flow rates 528, 530 for Waste Diggers 1 and 2 are shown in FIGS. 4(c) and (d).

FIG. 4(e) shows the ROM stockpile planned flow rate 510 over time, and FIG. 4(f) shows the ROM shovel planned flow rate 512 over time. FIG. 4(g) shows the crusher in-planned flow rate 514 over time, and FIG. 4(h) shows the waste stockpile in-planned flow rate 532 over time.

The example illustrated in FIG. 4 includes several planned flow rates for flows between a number of sources and destinations within the mine operation. In some situations, depending on the mine operation and the relevant circumstances, the flow planner 106 may provide only one planned flow rate for one source-destination pair.

To ensure that the minimum desired flow rate of the crusher is met, the flow planner 106 plans to build up the ROM stockpile during the first half an hour 510, and to then feed the crusher 514 exclusively from the ROM shovel for the second half an hour (coinciding with digger offline periods 502 and 504 as shown in FIGS. 5(a) and 5(b)). In addition, the flow planner 106 saves most of the planned material flow rates of HG Digger 2 for the last hour 534 of the scenario.

This example can be used to illustrate how the flow planner 106 algorithm takes ROM stockpiles into consideration, specifically for the use-case where they are used as a buffer for digger down-times, such as those mentioned above. In some embodiments, the flow planner 106 includes these ROM stockpiles to automatically ensure the crusher flow rate is kept above a minimum level or a threshold level throughout the planning timeline (e.g. a part of a shift, an entire shift, or more than a shift). By including the ROM stockpiles as both a dump point and a source for material (with an appropriate digger assigned), the ROM can be built up before, for example, a blast or digger maintenance event, and then used to feed the crusher during this down-time. The capacity to which the ROM is built up is designed automatically around the required material flow out of the ROM during said down-times, with consideration for the duration of the down-time and other available material to feed the crusher.

The effect of the flow planner 106 taking the ROM stockpile into consideration when determining the planned flow rates can be seen in the scenario illustrated in FIG. 4, in which both high-grade diggers are taken offline for 30-minutes (note the flow-rate for each drops to zero from 30-minutes to 60-minutes along the timeline in the top two graphs at 502 and 504). In order to maintain crusher throughput, the flow planner 106 schedules the majority of high-grade material mined in the first 30-minute periods 506, 508 to be dumped onto the ROM stockpile 510, allowing it to be used to feed the crusher in the second 30-minute period 512 when the high-grade diggers are unavailable 502, 504. The overall effect is a plan in which the crusher is not starved for high grade ore, as illustrated in FIG. 4(g) showing the crusher in-flow rate 514 over time.

This example illustrates that the flow planner 106 takes planned events into consideration, and when unexpected or unplanned events occur, the flow planner 106 is able to also take these into consideration when the flow planner 106 is run again (as illustrated in FIG. 1 by the flow planner feedback loop 122) to generate an updated flow plan with updated planned flow rates for the receding horizon.

One challenge with rerunning the flow planner 106 partway through a shift is determining the volume of material remaining in a block, and the volume of material that has been dumped at the various dumps. In particular, there will always be some trucks that are in transit between a block and dump at any given time. If the dispatcher 108 has already allocated these trucks to specific dumps, then this is trivial. However, if the dispatcher 108 only provides turn-by-turn instructions, then it is not known which destination the material will end up at. In this case, the initial amount of material from each block at each dump, which is used as an input to the flow planner 106, is calculated to include the volume of material in transit. In one embodiment this is done by apportioning the material in transit to all possible destinations for that material in proportion to how much material is still to be dumped there.

The length of time over which the flow planner 106 plans may be variable. In one embodiment planning is performed to the end of the current shift. However, one of the key challenges in current systems is dealing with the shift change, and planning only to the end of the shift means that any events that occur at the beginning of the next shift may not be planned for adequately. Therefore, in embodiments where computational requirements allow for it, planning is performed into or up to the end of the next shift. This results in the reduced availability of trucks and shovels around the shift change being explicitly incorporated into the determined planned flow rates.

In the system 100 shown in FIG. 1A, the flow planner 106 performs high-level planning to determine planned flow rates, and the dispatcher 108 then determines dispatch assignments based on the planned flow rates received from the flow planner 106. The dispatcher 108 optimises the dispatch of assets in view of received global mine data so that the assets can execute a certain number of activities in order to achieve the required planned flow rates. This may be understood with reference to a haul system.

When used for a haul system consisting of a heterogeneous fleet of trucks travelling along a pre-defined road network, the dispatcher is used to task each truck with its destination(s), taking into account desired and predicted need of truck capacity as well as system constraints. The destinations include activity stations. At the activity stations the trucks perform tasks, for example loading, unloading, refuelling or pausing.

The dispatcher's objective is to effect a given number of activities at the activity stations. In this exemplary embodiment the system's purpose is haulage, and therefore the activities are given as load-unload pairs with two activity stations $(a_1, a_2)$. The truck first visits a first station $a_1$ where it is loaded and next visits a second station $a_2$ to unload the cargo.

Some embodiments consider not only load-unload pairs, but also arrivals at intersections so that the decisions made at each intersection (that is, which direction to move in from that intersection) are also considered to be potential tasks in the schedule. The resulting dispatch schedule is a series of connections through various decision points which then include intersections, loading, and unloading.

Existing dispatchers typically define the dispatch goal as a fixed number of activities to achieve at the end of an execution period, e.g. by the end of a shift. The dispatcher 108 described herein, on the other hand, not only provides the number of times activities need to occur (in total, over a flow plan planning horizon), but also provides a temporal distribution of activities. The distribution of activities, or the rate that activities occur, as effected by the dispatch assignments may vary over time for a number of reasons, e.g. if the planned flow rates are not steady state targets, if the conditions in the mine change, or if the actual effected flow rates do not match the planned flow rates. In other words, the dispatch assignments result in a temporal distribution of activities that is not necessarily at a fixed rate. This more flexible approach results in planned flow rates being tracked more accurately, and accordingly also results in improved efficiency.

Accordingly, the dispatch goal optimised by the dispatcher 108 is defined as a function over time.

The dispatch goal is defined by a goal function g that maps the required activity, e.g. a load-unload pair $(a_1, a_2)$, and a point in time t to the number of times the pair should have been serviced at time t. Thus g is a monotonically increasing function of t, and in this example a piecewise linear function of time:

$$g((a_1, \cdot), t) = \sum_{a_2 \in A} g((a, a_2), t)$$

Because g is a goal (not a constraint) the solution is not required to match the values of g precisely. Instead, g may be given as a continuous function which is then approximated by the dispatched assets, e.g. a haul system using discrete vehicle loads.

g defines multiple objectives, one for each activity, e.g. each load-unload pair. To use g as a goal for an optimisation, the objectives must be combined into a single objective. Accordingly, the dispatch optimisation objective function is the sum of individual goal functions:

$$o(t) = \sum_{(a_1, a_2) \in A^2} e(\text{achieved}((a_1, a_2), t) - g((a_1, a_2), t)) + \sum_{a \in A} e(\text{achieved}((a, \cdot), t) - g((a, \cdot), t))$$

In this dispatch objective function, achieved($(a_1, a_2)$,t) is the number of times the load-unload pair (a1, a2) was services, and achieved ((a, •),t) is analogous to $$g((a, \cdot), t) = \sum_{a_2 \in A} g((a, a_2), t)$$

To achieve a temporal distribution, the dispatch assignments are determined by optimising the dispatch of assignments over a dispatch planning window. As time progresses through a shift, the dispatch planning window is effectively a moving window that looks forward at the next one or more activity periods. In this way the dispatcher 108 determines the dispatch assignments over a receding horizon.

When the dispatcher 108 recalculates the dispatch assignments, discrepancies between the given goal (i.e. number of activities to be achieved) and the system's achievement (i.e. number of activities actually achieved) are taken into consideration and used to modify the recalculated dispatch assignments. e(x) is an application dependent error function which maps the discrepancy between the system's achievement and the given goal to a numeric reward or penalty. Applying the error function when recalculating the dispatch assignments to adjust for discrepancies, distinguishes the present dispatcher 108 from existing dispatchers that generally optimise dispatch assignments once, off-line, in order to achieve a steady-state flow rate across a shift.

The dispatcher 104 determines e(x) in such a way that the system is rewarded most when a goal function is matched closely. In some embodiments over-achievement may be penalised in the same way as under-achievement. However, it may not be desirable to penalise over-achievement in the same way because if the goal function is growing continuously as part of an ongoing process, continuing over-achievement may be desired.

In order to moderately reward over-achievement, in one embodiment an over-achievement reward is defined (e.g. proportional to a square root function) that is smaller than a defined under-achievement penalty, or negative reward, that is used to penalise under-achievement (which may be e.g. proportional to a parabola). The use of the square root results in diminishing returns the more the system overachieves. Using diminishing returns encourages the system to over-achieve evenly across the different objectives since moderately over-achieving all objectives results in a higher value compared to massively over-achieving a single objective. Accordingly, in one exemplary embodiment the dispatcher 108 implements the following error function:

$$e(x) = \begin{cases} \frac{1}{4} - \left(x - \frac{1}{2}\right)^2 & \text{for } x \leq 0 \\ \sqrt{x + \frac{1}{4}} - \frac{1}{2} & \text{for } x > 0 \end{cases}$$

In one embodiment, the dispatcher 108 uses a heuristic search algorithm to determine the dispatch assignments. In an exemplary embodiment, the dispatcher 108 is based on a heuristic search algorithm such as a Monte Carlo Tree Search (MCTS) algorithm which is a sampling-based algorithm that explores (and builds) a decision tree of possible actions in order to determine the best 'next action'. This algorithm seeks to choose the best immediate action, given a highly uncertain future. Using the MCTS algorithm, the dispatcher 108 generates asset assignments as its output taking into consideration global mine data as well as a traffic model.

The traffic model is used to provide limits for travel times based on the other traffic on the road, either ahead in the form of bunching, or blocking intersections while other traffic passes across the path (based on standard right-of-way turning rules). Vehicle model parameters such as speed, loading and dumping performance are sampled from prior performance data, for example as measured in the mine during operation and available from the relevant mine operation database 124. This data is then incorporated into the traffic model.

One challenge is to translate vehicle movements and their interactions along the road network to a model suitable for an MCTS decision tree.

The system can be described by a tuple (R, V, D, Vo, P, F, A), where R is the road network, V is the set of vehicles in the system, D is a set of discrete vehicle states, Vo contains the initial states and positions of the vehicles, P is the performance function, F is the following distance, and A is the set of activity stations.

R: The road network is a directed graph with its vertices representing road locations and the edges representing roads. In some embodiments vehicles may have different constraints about the roads they are able to use, resulting in different subsets of the road network being application for each vehicle type.

V: The set of vehicles in the system relates to vehicles travelling along the road network. At each point in time a vehicle is either at a vertex or traversing one of the road network's edges.

D: To distinguish between vehicle states such as loaded and unloaded and the different kinds of cargo a vehicle might have loaded, a set of discrete vehicle states is given. At each point in time, a vehicle has exactly one of the states. The states are application specific but would most likely contain an element for each type of cargo a vehicle can have loaded. A transition function is a function that maps a vehicle and its discrete state to the discrete state the vehicle will have after performing a particular activity (i.e. loading/unloading).

P: The performance function governs how fast the vehicles move through the road map. It maps a vehicle, its discrete state and an edge of the road network to the time it takes for the vehicle to traverse the edge. The performance function maps a vehicle and its discrete state to the amount of time the vehicle needs to perform the activity.

F: Since several vehicles can traverse an edge of the road network simultaneously, information must be provided about the distance vehicles must keep from each other. This distance can be determined by the physical size of the vehicles because they cannot occupy the same point in space simultaneously. In practice, however, a safe minimum following distance is given. In some embodiments the following distance is specified in meters. In other embodiments the following distance is specified as a time duration and then the following distance is the minimum number of seconds a following vehicle must stay behind the vehicle that is being followed. One advantage of choosing a time-based approach is that the problem formulation stays agnostic of the spatial layout of the road network. The following distance is defined to map a vehicle, its discrete state and edge to the minimum number of seconds the vehicle must remain away from another vehicle along the edge.

A: Each activity station is associated with a location. Analogous to the following distance of the road network, a following distance is defined for activity stations. In some cases the activity station can be used by only one vehicle at a time, and in other cases vehicles can be served in parallel.

The potential actions of individual vehicles are represented as a transition graph. A transition graph is a directed graph where vertices correspond to possible vehicle states (i.e. loaded or unloaded) whereas edges correspond to transitions between the vehicle states such as driving along the road network or visiting an activity station. The heuristic search algorithm therefore links a plurality of asset states (i.e. vertices) using asset transitions (i.e. edges).

The state of an asset, e.g. a vehicle, which is at a vertex of the road network is completely described by its location and its discrete state. To avoid creating identical sub-graphs for each vehicle, identical vehicles are grouped by vehicle type. Each of the edges of the graph represents a possible transition between the states. The edges are each associated with one or more parameters, including: the road length, the following distance, the road index, a reward type, and a reward value. Edges of the transition graph and the transitions they represent are referred to interchangeably. The length and the following distance of the transition govern the amount of time the vehicle needs to transition from the source state of the edge to the edge's target state. A transition may represent a movement along the edge of the road network, or a transition may correspond to an activity station.

Different edges of the directed graph are allowed to share the same road or activity station. This is necessary to keep apart different vehicle types or states. For example, an edge corresponding to a loaded vehicle might use the same road as an edge which corresponds to an empty vehicle. To keep track of these vehicles interacting with each other, a road index is stored for each transition. All transitions that share the same road index are considered to share the same physical road or activity station.

The reward information includes a reward type and a reward value. In its simplest form, the reward information contains a single value which gets added to the total reward of the system's state whenever the transition is executed. However, since the goal function specifies multiple objectives, in some embodiments several distinct reward types are maintained. Each transition contributes to only one of the reward types allowing the dispatcher 108 to keep track of progress on different individual goals.

Each load-unload pair contributes to two reward types: a first transition reward and a second transition reward. The first transition reward signifies the load action which is shared amongst all load-unload pairs with the same load location: $g(a_1, \bullet)$.

The first transition reward is granted as soon as the vehicle has finished loading.

The second transition reward is specific to the load-unload pair: $g(a_1, a_2)$

The second transition reward is awarded as soon as the vehicle finishes unloading. Some embodiments include only the second transition reward type. Other embodiments have a third transition reward at the load location as well to introduce a reward earlier in the search tree. Thus, loading cargo is rewarded even if the time of unloading is beyond the planning horizon.

By convention, final states are not allowed and thus each vertex must have at least one outgoing edge. If a final state for a vehicle is desired, it is possible to create a vertex in the transition graph with only a single outgoing edge which loops back to the vertex.

Whenever two vehicles of the same vehicle type and discrete state cross paths, they would, if naively implemented, share the same state in the transition graph. Subsequently, the further options for the two vehicles are identical. The issue becomes intensified when the two vehicles are travelling in opposite directions. The effect is that at any vertex of the road network the vehicle is offered the option to turn around and go back to where it came from. It is not only the inefficient behaviour of the vehicle that is a concern, but also the amount of choices it provides. Any time the vehicle is offered more than one choice, a decision point arises which must be explored by the dispatcher 108. Thus offering a large number of redundant choices is undesirable.

This problem is alleviated by adding the set of possible destinations to the state labels of the transition graph. The effect is that only vehicles with the same choice of future transitions actually share the same vertex of the transition graph. Whenever a vehicle is traversing the road network, the corresponding states of the directed graph are labelled with the set of road locations it may be going to. Allowing sets of destinations ensures that paths on the road network that are identical initially but split later on share the same path in the directed graph. This not only reduces the size of the directed graph, but also delays decisions which is beneficial during the optimisation stage.

The state of the entire system is defined by the vehicles that are part of the system, the asset state for each vehicle (or the state that the vehicle is transitioning to) as represented by a vertex of the directed graph, the point in time the last vehicle that entered the road segment has finished or will finish its transition, and the reward type and reward value associated with the relevant transition.

The dispatcher 108 uses the MCTS algorithm to incrementally build a search tree, starting with an initial state. Each node of the tree is labelled by several pieces of information: (i) the state belonging to the node, (ii) the number of times the node has been visited, and (iii) the sum of the values of all episodes created when visiting the node.

Each iteration of the algorithm starts at the root node and traverses successive child nodes until a leaf node is reached. At each node which is not a leaf node, one of the child nodes is selected as the next node to go to. Whenever a child node must be selected, it is selected based on the number of child nodes of the current node, the number of times the current node has been visited, the number of times each child node has been visited, and the sum of all episodes values. This is done in a way that balances exploration against exploitation.

Once a leaf node of the tree is reached, its child nodes are created. For this, the next vehicle to advance is determined and all outgoing edges of the vertex corresponding to the state of the next vehicle are taken from the transition graph. For each of the outgoing edges the state of the node is advanced and a new child node containing the next state is created. In order to avoid creating tree nodes with only a single child node, whenever the state has only one possible further transition in the transition graph, it is advanced further until a decision point arises (or the planning horizon is reached, e.g. the end of an activity period, or the end of a shift).

Once the new child nodes are created, their state is rolled out to the end of the planning horizon. For this, the state is advanced until all vehicles have advanced past a set planning horizon for the dispatcher, which is typically an activity period.

Once the end of the activity period is reached, the dispatcher 108 determines the value of the final state according to the objective function. The objective value is then propagated back towards the root node by incrementing a visit counter and adding the final state to the vertex for every node on the direct path from (and including) the newly created child node to the root. Once the tree has been sufficiently expanded (or the computational resources have been exhausted), the dispatcher 108 chooses the best actions by traversing the tree as before one child node at a time.

The goal function per vehicle with its load-unload activity station pairs implicitly defines an average number of vehicles that should service each activity station pair per time interval. In some embodiments, this time interval is an activity period as defined herein. Thus, the nominal flow for a pair of activity stations is based on the start and end time of the considered time interval. The nominal flow for a pair of activity stations $(a_1, a_2)$ can be calculated as follows:

$$f((a_1, a_2)) = \frac{g((a_1, a_2), t_{end}) - g((a_1, a_2), t_{start})}{t_{end} - t_{start}}$$

The total flow between the activity stations, as determined at 602 in FIG. 5, can be broken down further into flow rates separated by vehicle type. In some embodiments it is not defined which vehicle type has to service which load-unload pair, therefore the decomposition can potentially be done in many ways as long as the nominal flow is based on the activities assigned each vehicle and only vehicle types that are able to service the relevant activity pair have positive flow:

$$f((a_1, a_2)) = \sum_{v \in V^\sim} f((a_1, a_2), v)$$

In this example, the asset or vehicle states are therefore either loaded or unloaded, and the asset or vehicle transitions refer to loading or unloading at an activity station.

After a vehicle completes servicing a load-unload pair, it usually must drive to another load location before it is able to perform another task. Thus, unless the load-unload flow rates match up, the system also requires an additional empty or unloaded flow of empty vehicles moving from an unload station to the next load station. The flow of empty vehicles must be equal to the flow of loaded vehicles. This can be described as a linear program so that the dispatcher 108 may include an off-the-shelf MILP solver to solve for loaded and unloaded flow split per vehicle type. The objective function is the sum of all flow rates weighted by the time needed to execute any particular flow segment: the time needed for servicing load-unload pairs, and travel times for an empty vehicle. The linear program is completed by adding constraints limiting the flow based on the number of available vehicles.

The linear program only depends on information that is known upfront. Thus it needs to be solved only once at the beginning and the result can be reused throughout the life time of the haul system until there are major changes to the system's parameters or the objective function. In cases where the objective function is not linear in time, the linear program must be solved separately for each of the linear intervals of the objective function.

The dispatcher 108 implements a rollout heuristic to route vehicles through the transition graph according to the flow rates. A flow rate can be assigned to individual edges of the transition graph. Each edge has an associated edge flow rate. The value of each edge flow rate is derived from the loaded and unloaded flow rates of the system.

Whenever a leaf of the search tree is reached, the value of the state must be evaluated. For larger horizon problems, it may be hard to find a consistent heuristic for such a value function. To account for this, the dispatcher 108 advances the state of the leaf node until a final state is reached using random choices and heuristics. However, with directed choices instead of random choices the MCTS is likely to converge faster towards optimal solutions. Whenever there is more than one option of outgoing edges in the transition graph, the dispatcher 108 chooses one according to a rollout heuristic. Since a large amount of the computational cost is due to performing the rollouts each time a leaf is reached, the dispatcher 108 selects a heuristic function to be computationally efficient.

The dispatcher 108 uses a rollout heuristic to improve the dispatch assignment by applying the following three goals:

(i) The first biases the flow rates according to how well the set target is reached to improve the routing at vertices where several outgoing edges of the transition graph have a positive flow (illustrated at 606 in FIG. 5). In this way, a positive flow is implemented for asset state pairs, i.e. based on the load-unload pairs as required by the goal function g.

(ii) The second anticipates queuing and aims to prevent sending vehicles to activity stations when they are likely to face a waiting period in a queue (illustrated at 608 in FIG. 5). This means avoiding queuing at the activity stations.

(iii) The third aims to balance the distribution of assets within different flow components of the transition graph (i.e. loaded and unloaded flow rates) to ensure that all flowing parts of the transition graph have adequate numbers of vehicles available (illustrated at 610 in FIG. 5). This means balancing a distribution of assets within the two asset states, i.e. distributing loaded and unloaded vehicles evenly along the active part of the road network.

FIG. 5 illustrates one embodiment of a method 600 for selecting an outgoing edge in a transition graph using a rollout heuristic. At 602, the dispatcher 108 determines the total loaded and unloaded flow rates per vehicle type associated with a pair of load-unload activity stations. The outgoing edge in the transition graph is selected at 604 based on edges with a total positive flow. Where several such edges with positive flow exist, the best of these is selected at 606 by biasing the flow to steer the system towards the set targets. Optionally (and therefore illustrated in broken lines) in some embodiments at 608 edges may be selected that avoid queuing of vehicles, and at 610 edges may be selected to balance the distribution of vehicles with different flow components to ensure that all flowing parts of the transition graph have adequate numbers of vehicles available.

Referring to the first goal (i), as illustrated at 602, 604, and 606 in FIG. 5, the initial steps of the rollout heuristic can be summarised as determining a total flow rate per edge, selecting edges with positive total flow, and biasing the intended flow (i.e. the flow rate achieved by the dispatch assignment) towards the planned flow rates.

For each pair of activity stations and vehicle type with positive flow, the edges corresponding to loading and subsequent unloading of a vehicle type as well as the edges representing the direct path between the two are identified. The loaded and unloaded flow rates for those edges are then added together. Then, for each pair of activity stations and vehicle types with a positive loaded flow, the edges corresponding to the path between unloading and subsequent loading are identified and the values of the loaded and unloaded flow rates are added together for those edges.

Accordingly the heuristic aims to route vehicles along outgoing edges of the transition graph with positive flow. In case of several such edges, one is selected randomly with a probability proportional to its flow. While this basic heuristic succeeds in keeping the haul system productive, it falls short of matching the operating parameters set by the objective function. The reason is that any imbalance in the system (i.e. if the flow is not perfectly matched) is likely to be amplified by the dead-reckoning nature of the heuristic.

Thus the dispatcher 108 includes elements of a feedback controller to allow the algorithm to steer the system towards the set targets, for example, in the form of the dispatcher feedback loop 120.

Because the flow of full vehicles corresponds to the growth rate of the objective function, and the objective function corresponds to the desired values of the reward types, if the reward types are on target, the flow rates also correspond to the desired growth rates of the reward types. If, however, the reward types are ahead of or behind their target values during the rollout, the desired flow rate can be biased to steer the system back towards the set goals.

The bias formula that provides the flow rates for dispatched assets is designed such that if the actual flow rate is behind the planned flow rate then the dispatcher 108 increases the intended flow rate linearly, whereas if the actual flow rate is ahead of the target flow rate then the dispatcher 108 decreases the intended flow rate in an inverse proportional fashion. The latter ensures the actual flow rate never reaches zero and the system still makes reasonable choices when all rewards are ahead of target. The biased flow provides the intended flow rate that is effected by the dispatcher 108.

For loaded flow the biased flow is given as:

$$f_e^*((a_1, a_2)) = \begin{cases} f_e((a_1, a_2))\left(1 + \alpha \frac{g((a_1, a_2)) - r_i^s}{f((a_1, a_2), \cdot)}\right) & \text{for } r_i^s \leq g((a_1, a_2)) \\ f_e((a_1, a_2))\left(1 + \beta \frac{r_i^s - g((a_1, a_2))}{f((a_1, a_2), \cdot)}\right)^{-1} & \text{for } r_i^s > g((a_1, a_2)) \end{cases}$$

where $r_i^s$ is the reward type associated with the load-unload pair $(a_1, a_2)$ and $\alpha$ and $\beta$ are tuning parameters which can be set to 1.

For unloaded flow the biased flow is given as:

$$f_e^*(a_1) = \begin{cases} f_e(a_1)\left(1 + \alpha \frac{g((a_1, \cdot)) - r_i^s}{f^\Theta((\cdot, a_1), \cdot)}\right) & \text{for } r_i^s \leq g((a_1, \cdot)) \\ f_e(a_1)\left(1 + \beta \frac{r_i^s - g((a_1, \cdot))}{f^\Theta((\cdot, a_1), \cdot)}\right)^{-1} & \text{for } r_i^s > g((a_1, \cdot)) \end{cases}$$

While biasing the flow works well for interconnected flow cycles, it fails to distribute vehicles between disconnected flow cycles. The flow in the transition graph inherits the flow consistency provided by equating full and unloaded flow rates. Because the flow has no sources and sinks and the graph is finite, it follows that edges with positive flow and their vertices fall into disjoint components such that each vertex is reachable from any other vertex within the same component and no vertex of another component can be reached.

Furthermore, edges with zero flow can be attributed to flow components as well. Each edge with zero flow is said to lead to a flow component that can be reached by traversing the next and subsequent edges with zero flow. According to this definition, edges with zero flow can lead to several flow components simultaneously. Furthermore, each edge leads to at least one flow component. If edges were present that do not lead to a flow component, following such an edge could never result in an increase of the reward function and thus the dispatcher 108 discards such edges.

Since each edge of the transition graph has a length and flow associated with it, the dispatcher 108 calculates nominal number of vehicles required for this edge based on the length and flow.

Repeating this for every edge within a flow component results in a total number of vehicles required for each component. Vehicle types are ignored here since different vehicle types always reside in different flow components.

If, during the rollout, a flow component has less than the number of vehicles required for that component available to service its flow, the system will fall short of the targets related to this component. Subsequently, the dispatcher 108 attempts to distribute vehicles between flow components as needed by routing vehicles along edges with zero flow.

The dispatcher 108 can donate a vehicle that is on one disjoint component to another flow component if the vehicle is at a vertex which has outgoing edges belonging to the first component as well as outgoing edges leading to the second component. The dispatcher 108 considers such a donation whenever the first component has more than the required number of vehicles while the first component has less than the number of vehicles required for the second component. If this is the case, the vehicle is donated with a predefined probability.

If the vehicle can be donated to several components which all have a shortage of vehicles, the dispatcher 108 selects the receiving edge at random with a probability proportional to the number of trucks missing in the flow components the edge leads to. When determining the number of vehicles that are currently on a flow component, the dispatcher 108 can also count the vehicles on edges leading only to that component. However, the dispatcher 108 should not consider vehicles that are on edges leading to multiple components. Such vehicles cannot be fractionally attributed to the components the edge leads to as this is likely to result in undesired behaviour.

The dispatcher 108 avoids decision tree edges (i.e. asset or vehicle transitions) that lead to queuing at activity stations as this may improve the system's performance. Thus, when the vehicle is at a decision point of the transition graph, the rollout heuristic attempts to predict whether choosing an edge with positive flow leads to queuing at the next activity station or not. If an edge with positive flow leads to queuing, it is not considered as a viable option as long as other non-queuing choices are available.

Making decisions during the rollout phase affects the performance of the algorithm. Thus, it is desirable that the queuing detection is computationally cheap. Therefore the dispatcher 108 may include pre-compiled small programs that allow prediction of the queuing solely from the system state and that do not require analysis of the transition graph.

Typically the activity stations are the bottlenecks of the system in the sense that vehicles can traverse roads at higher rates (with a smaller following distance) than they can pass through an activity station. If this is no longer true for a particular application, the true bottlenecks which cause queuing have to be used instead of the activity stations. The queue time of a vehicle traversing an edge is based on the length and following distance of a transition, the arrival time at the transition, and the time that transition is finished. The earliest point in time a vehicle can start traversing an edge without facing queuing delays is based on the time that the transition is finished, and the length and following distance associated with the transition.

The following distance limits the rate at which vehicles can pass through an edge. For the purposes of predicting queue times, a bottleneck flow rate at which vehicles can enter an edge with respect to the performance bottlenecks the edge leads to is defined. Thus, for an edge representing an activity station (or any other bottleneck), the bottleneck flow rate is equal to the unloaded flow rate.

For a first edge which directly precedes a second edge such that the second edge is the only outgoing edge of the vertex shared by both the first and second edges with positive flow, the earliest time the dispatcher 108 estimates a vehicle can start traversing the first edge without queuing is based on the first and second bottleneck flow rate and the number of times the target vertex appears in the set of states.

For the method described above, the required evaluation steps and many of the inputs remain constant for a fixed transition graph. The only variable inputs used by the dispatcher 108 are the road travel times and the number of trucks. This allows the system to precompute the evaluation formula and provide quick evaluation during the rollout.

In some embodiments, if different vehicle types service the same activity station, the dispatcher 108 includes vehicles from other edges into the number of vehicles currently traversing a particular edge. This allows the dispatcher 108 to take other vehicle types that are in transit into account when estimating the queuing. This issue only affects vehicles in transit. Once the vehicles have arrived at the bottleneck and are queuing, all types are considered automatically.

The three methods for making a choice during the rollout phase described above may lead to contradictory results making the system sensitive to the order they are applied in. In this embodiment, the dispatcher 108 uses an integrated approach based on the following principles:
(i) edges where queuing is predicted are only chosen as a last resort.
(ii) flow components are balanced according to the predetermined probability.

The rollout of the dispatcher may be implemented as shown in Algorithm 1:

| Algorithm 1 DecideRollout(v) |
| --- |
| 1: $O \leftarrow$ outgoing edges of $v$ |
| 2: $F \leftarrow \{e \in O \mid \text{flow}(e) > 0\}$ |
| 3: $L \leftarrow \{e \in O \mid \text{flow}(e) = 0\}$ |
| 4: $C_L \leftarrow$ components $C$ edges in $L$ lead to, $C \neq C_v$ |
| 5: $M \leftarrow \{C \in C_L \mid \text{vehicles}(C) > N(C)\}$ |
| 6: if $|F| = 0$ then |
| 7:   if $|M| > 0$ then |
| 8:     select random $C \in M$ with probability proportional to $N(C) - \text{vehicles}(C)$ |
| 9:     return $e \in L$ with $e$ leading to $C$. |
| 10:   else |
| 11:     return random $e \in L$. |
| 12: else |
| 13:   $C_v \leftarrow$ flow component of $v$. |
| 14:   $Q \leftarrow \{e \in F \mid t_e^* = \text{now}\}$ |
| 15:   if $|L| > 0$ and $\text{vehicles}(C_v) > N(C_v)$ then |
| 16:     if $\|M\| > 0$ and $\left(|Q| = 0 \text{ or } \text{rand}_{[0,1]} < \frac{1}{N(C_v)}\right)$ then |
| 17:       select random $C \in M$ with probability proportional to $N(C) - \text{vehicles}(C)$ |
| 18:       return $e \in L$ with $e$ leading to $C$. |
| 19:   if $|Q| = 0$ then |
| 20:     $Q \leftarrow F$ |
| 21:   return random $e \in Q$ with probability proportional to $\sum_{a_1, a_2 \in A} f_e^*((a_1, a_2))$ |

Figure 6A:
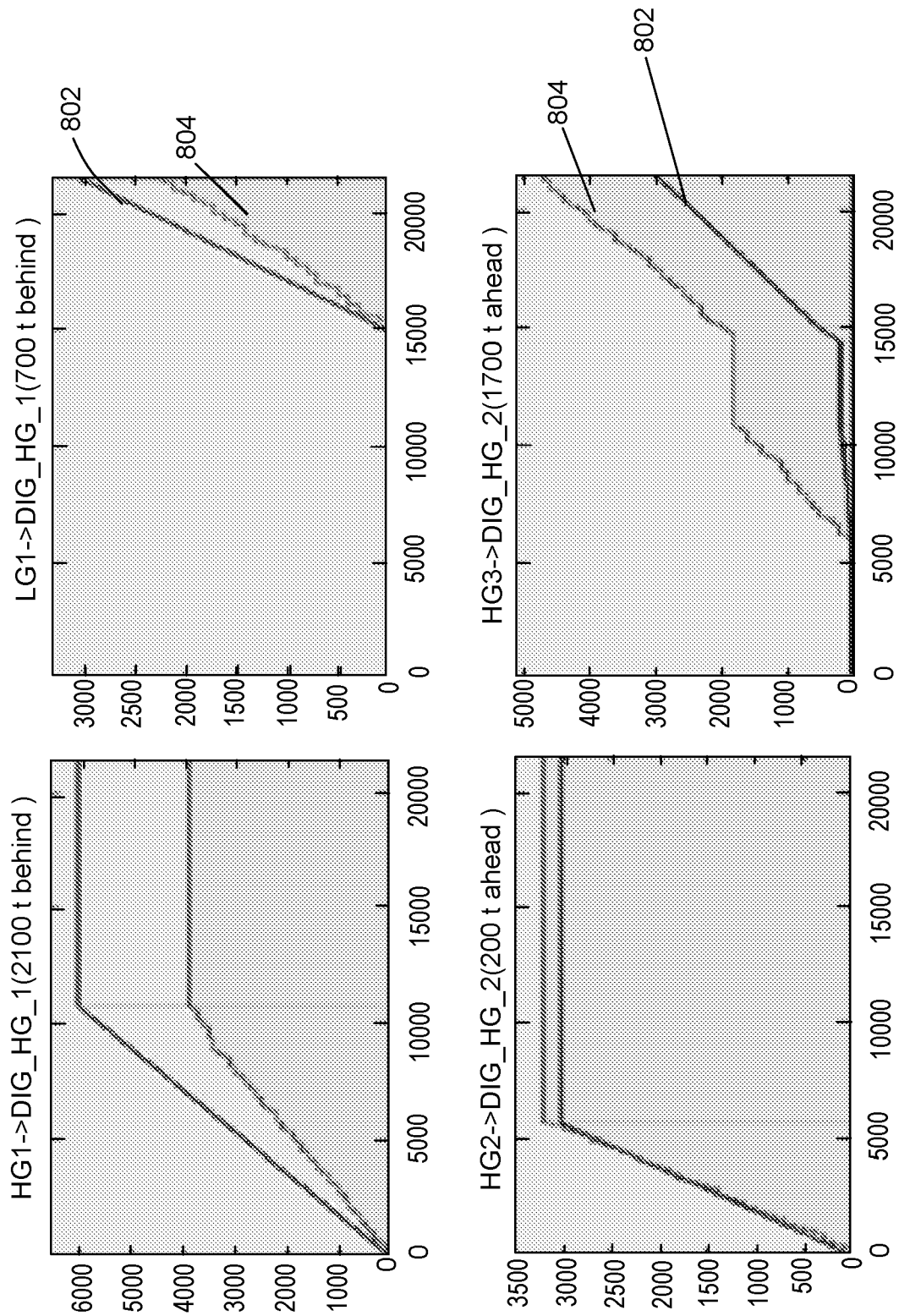
FIG. 6(a) illustrates the flow performance at dig blocks when existing software dispatch assignments are used.
Figure 6B:
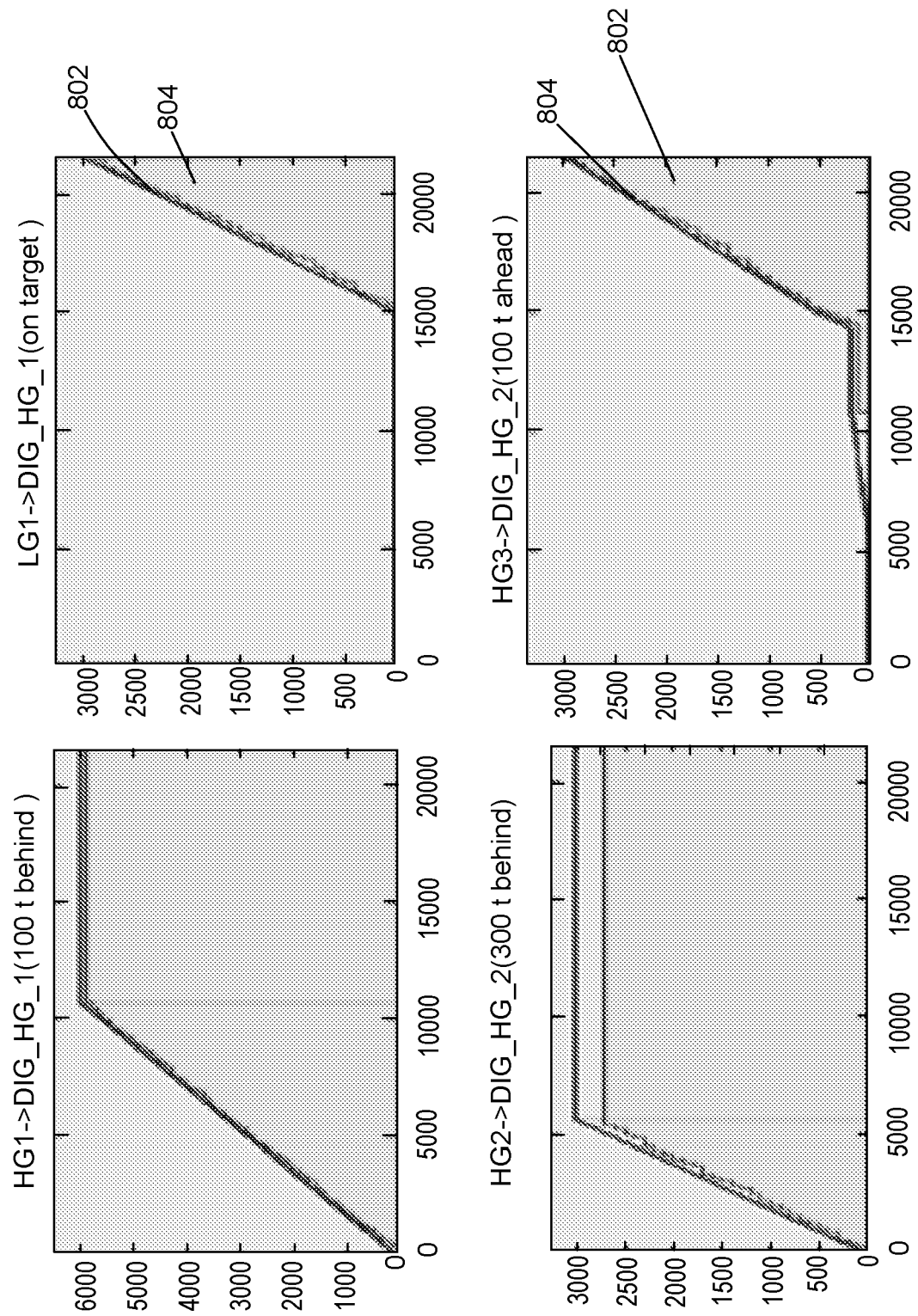
FIG. 6(b) illustrates the flow performance at the dig blocks when dispatch assignments are made with embodiments of the systems and methods described herein.
Figure 7A:
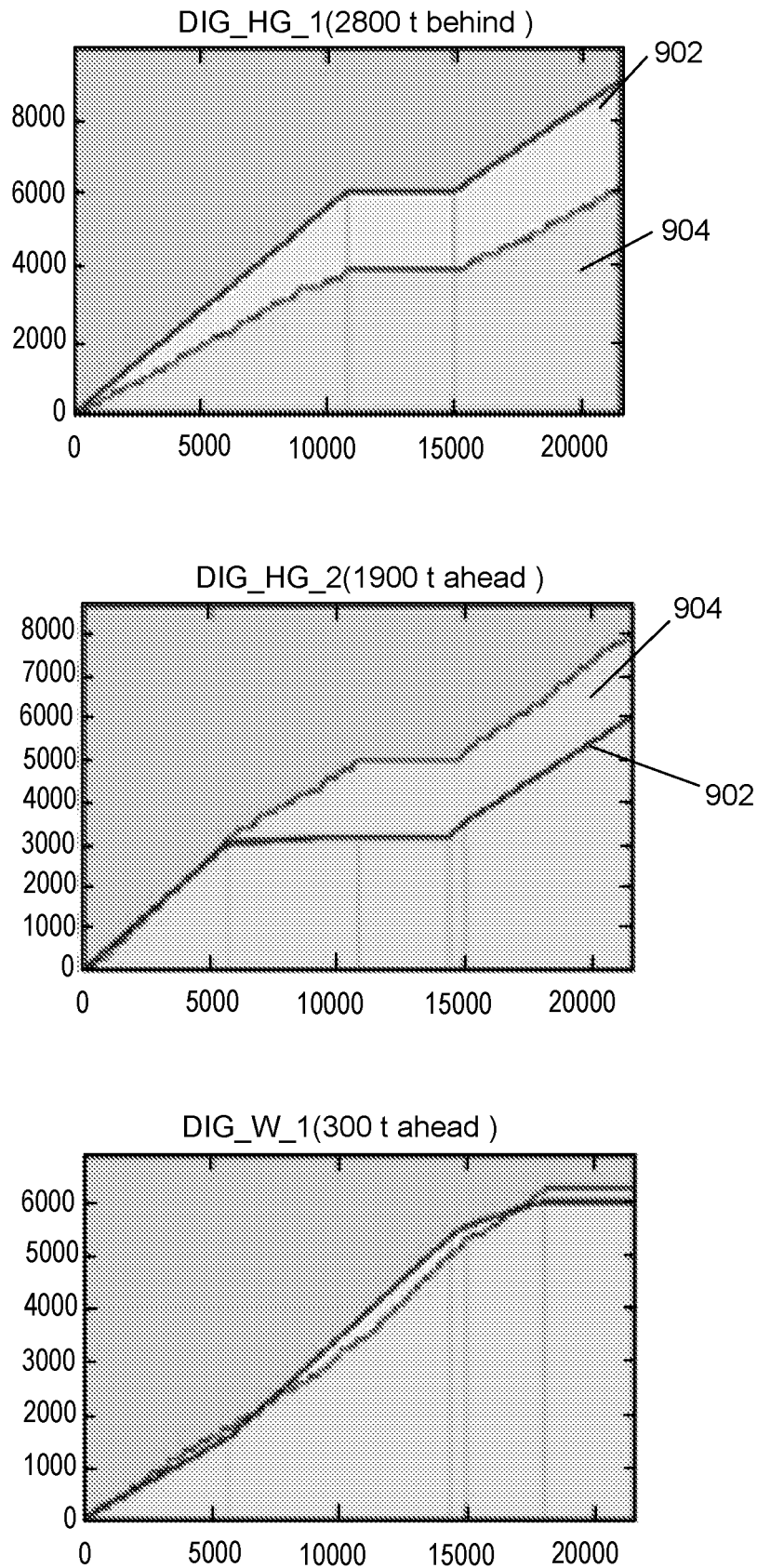
FIG. 7(a) illustrates the flow performance of the HG diggers when existing software dispatch assignments are used.
Figure 7B:
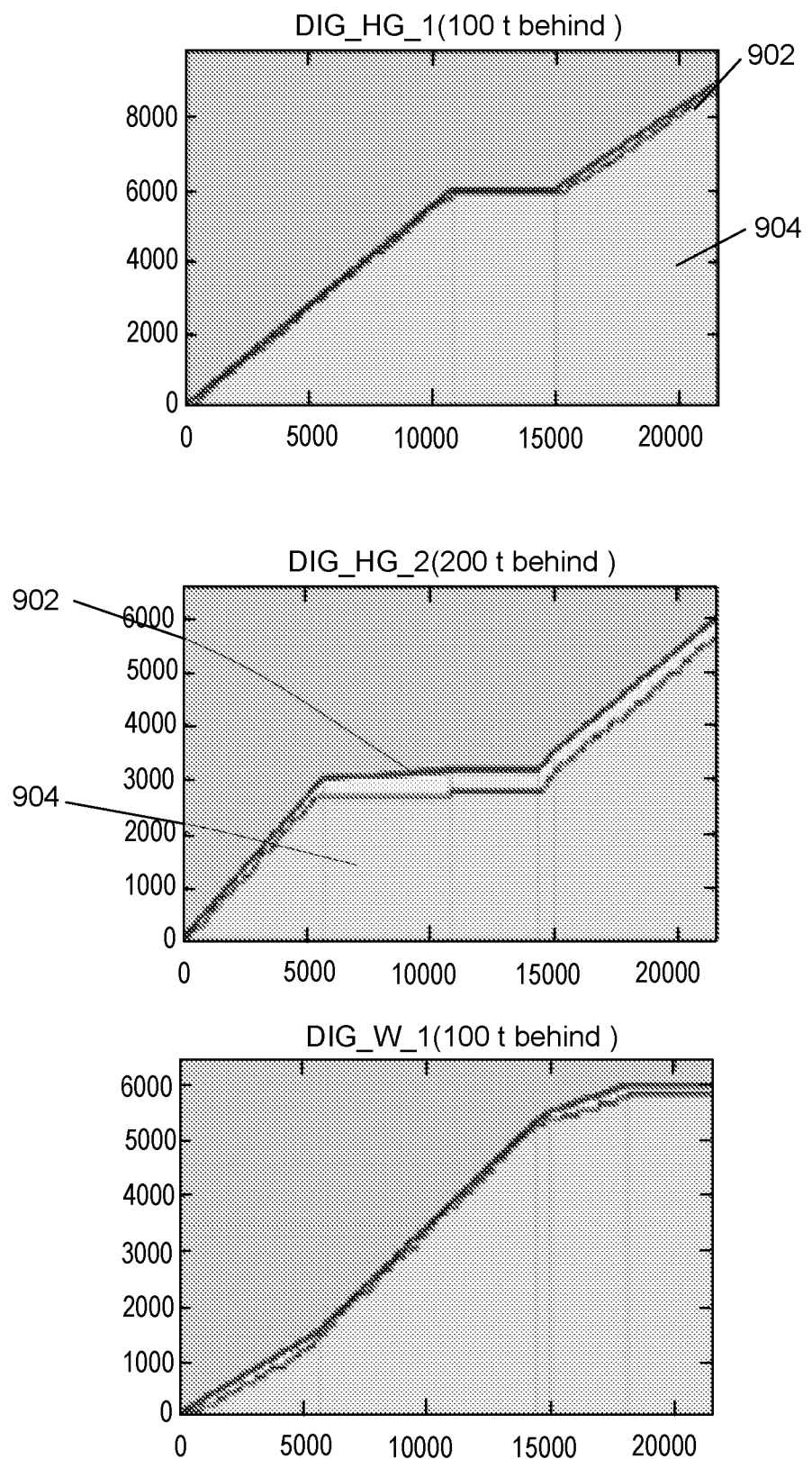
FIG. 7(b) illustrates the flow performance of the HG diggers when dispatch assignments are made with embodiments of the systems and methods described herein.
Figure 8A:
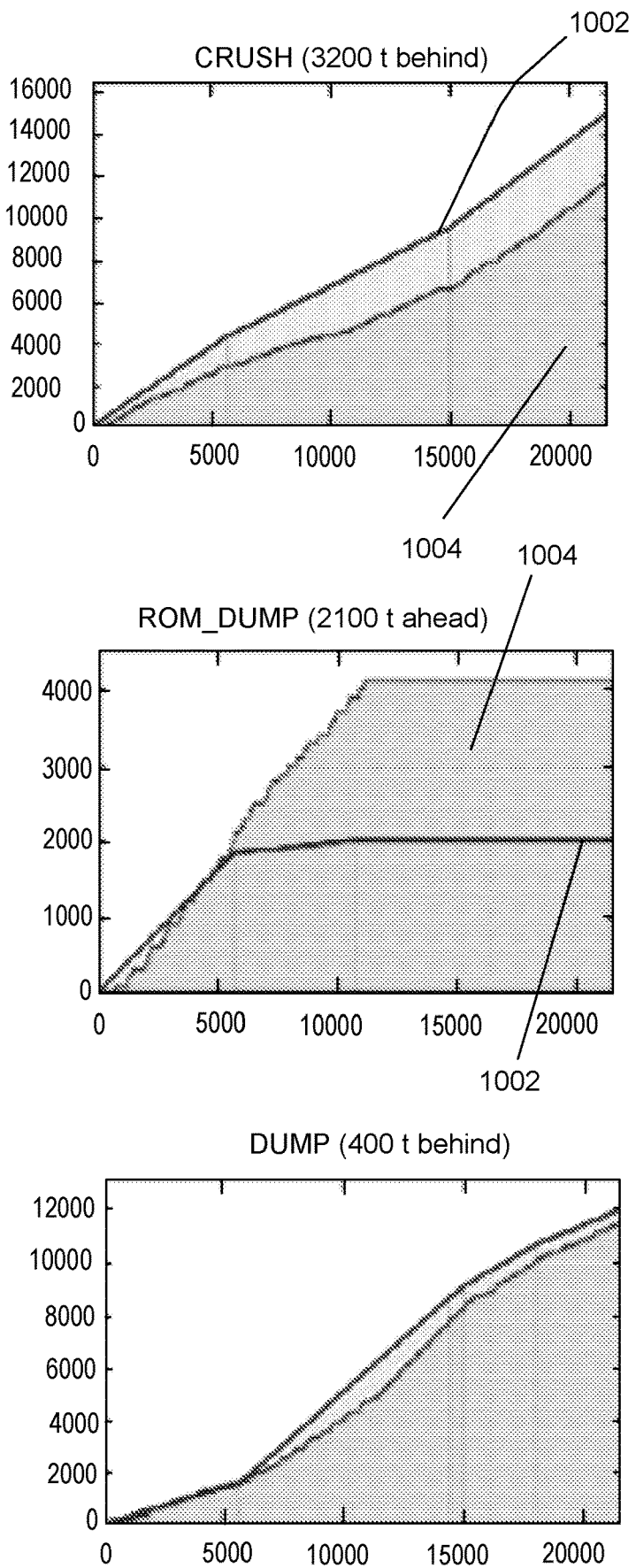
FIG. 8(a) illustrates the flow performance at the crusher, ROM dump, and dump when existing software dispatch assignments are used.

FIGS. 6-8 show how an existing software dispatch assignment (shown in part (a) of each of these figures) substantially under-performs on some diggers and over-performs on others, while the dispatcher 108 described herein tracks the planned flow rates very closely (as shown in part (b) of each of these figures). The net result in this case is the dispatcher 108 is able to move 3kt more through the process plant (meeting the planned 15kt material movement) than the existing prior art dispatch assignment over the 6-hour time window. The illustrated examples include planned flow rates that vary over time according to the flow planner 106 described herein, however the dispatcher 108 may also be used to determine dispatch assignments based on a flow plan provided by an operator or determined by a system other than the one described herein, for example a steady state planned flow rate. Thus applied, the dispatcher 108 effects a dispatch of mining equipment based on the dispatch assignments thereby effecting a steady state actual flow rate that tracks the steady state planned flow rate.

FIG. 6 compares the flow performance at the dig blocks with existing software dispatch assignments as shown in FIG. 6(*a*) to dispatch assignments made with embodiments of the systems and methods described herein as shown in FIG. 6(*b*). The line showing the planned flow rate 802 can be compared to the area illustrating the actual cumulative flow rate 804. FIG. 7 compares the flow performance of the HG diggers with existing software dispatch assignments as shown in FIG. 7(*a*) to dispatch assignments made with embodiments of the systems and methods described herein as shown in FIG. 7(*b*). FIG. 8 compares the flow performance at the crusher, ROM dump, and dump with existing software dispatch assignments as shown in FIG. 8(*a*) to dispatch assignments made with embodiments of the systems and methods described herein as shown in FIG. 8(*b*).

Various performance metrics are utilised for guiding the optimisation algorithms towards a particular solution, as well as for evaluating the quality of a particular schedule or solution. One or more of the metrics described below may be applied in one or both of the feedback loops 120, 122 in order to improve the performance of the system 100.

Effective Utilisation (EU) measures the proportion of time that a piece of equipment is being utilised for mining tasks. This metric is a proxy for productivity, in that it will be higher where the assets are regularly active and lower where they are regularly doing nothing.

In general, if a controller or planning system is attempting to meet a particular target set by a higher-level system, a typical approach to optimisation is referred to as 'conformance to plan'. In the case of the flow planner 106, this means the total material moved (or planned to move) compared to the planned movements from the next level up in the planning hierarchy (for example in the form of a mine plan that may be generated from, for example, a two-week plan). In the case of the dispatcher 108, this concept of conformance to plan means meeting the planned flow rates set by the flow planner 106.

Where a feasible plan is not achievable to move all the material specified in the higher-level plan, there is the option to prioritise those movements in some way, such as increased weighting on particular blocks, or ordered priorities or contingencies, such that some tasks are only attempted if there is excess capacity.

In some embodiments conformance to plan may be implemented in the form of a cost function based on a current cumulative flow rate, rather than the flow rate itself. That is, if the system is falling behind the overall schedule, it should attempt to 'catch up'. This is done to avoid biases causing 'integration effects', and may be used for the closed loop control that is intended to reduce the need for operator intervention (illustrated by feedback loop 120).

For plan comparison or analysis, the system 100 considers just a cumulative flow rate delta at the crusher or process plant, as this represents the mine's saleable material throughput.

In some embodiments 'excess travel distance' may be used as a means to measure the efficiency of haul truck movements. This is a comparison between the total distance all trucks travelled on their 'full' and 'empty' haul routes, against the nominal distances required to move the material, as calculated by the flow planner 106. The fact that the flow planner 106 is able to generate plans over extended time periods (e.g. an entire shift) allows this value to be calculated. The metric may be used either as a difference (excess travel in km) or a ratio (percent travelled more than necessary). While excess travel is not ideal, it may however be necessary for example where a re-assignment occurs in-transit, where unplanned outages occur, or where the shortest haul routes are inappropriate due to congestion, blockage or maintenance activity on the roads.

Figure 9:
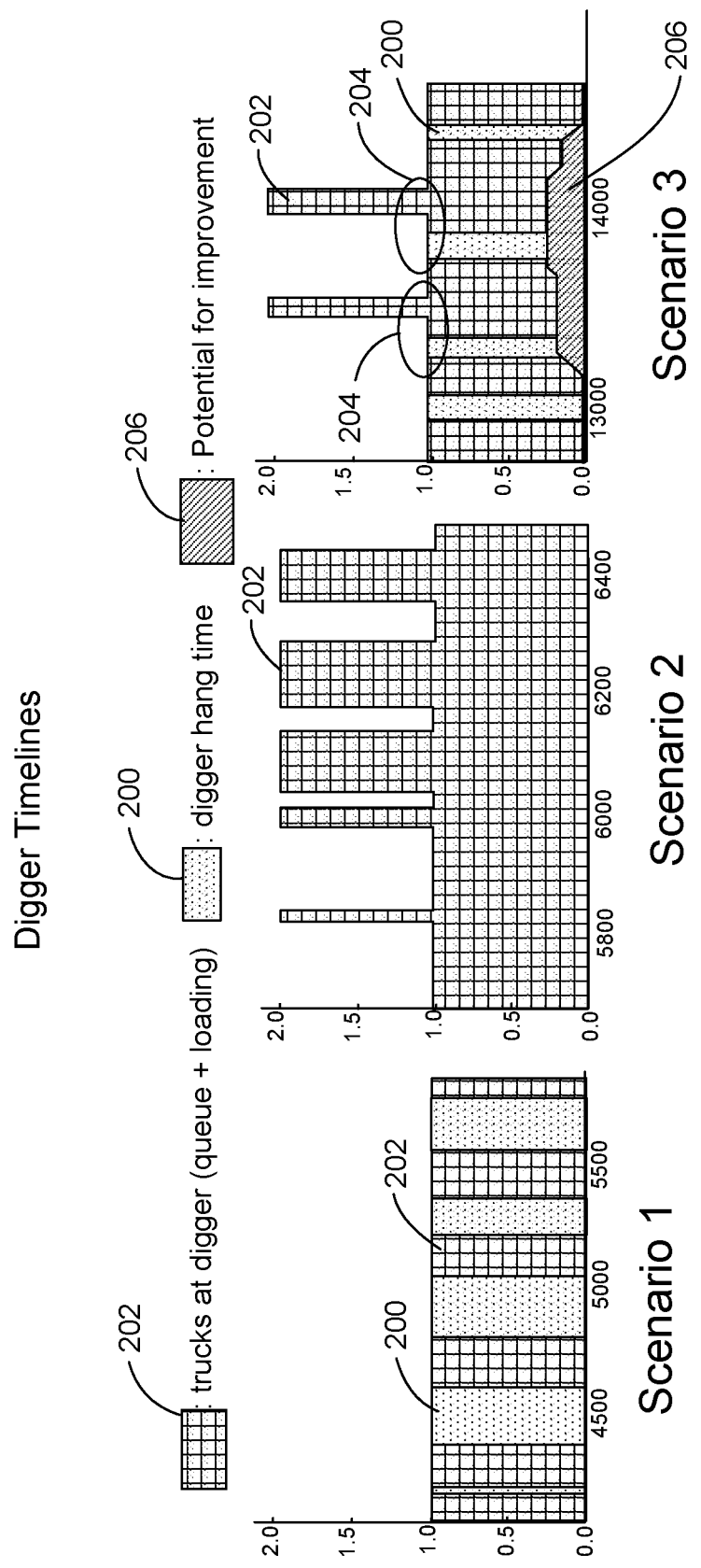
FIG. 9 is a diagram illustrating idle-avoidance potential.

In some embodiments 'idle-avoidance potential' may be used as a performance metric. This aims to indicate where there is problematic queueing (e.g. of trucks) or hang-time (e.g. of diggers). This is illustrated in FIG. 9. Digger hang-time 200 (Scenario 1) or truck queueing 202 (Scenario 2) may be unavoidable, depending on the constraints on the load-haul system, however where there is queuing in close proximity to hang time (Scenario 3) as shown at 204, this suggests that a better truck assignment may be possible. The potential for improvement 206 is shown in the Scenario 3 graph.

Both queueing 202 and hang-time 200 represent equipment sitting idle (and reduced EU). If a particular block of material must be moved with high priority, it would be advantageous to avoid any hang-time on the digger servicing the block; and then some excess queuing in order to ensure the digger is constantly operating at full capacity may be desirable. Conversely, if the mine is constrained by the haul truck fleet, then any queueing will mean a reduction in overall throughput, and thus it would be advantageous to experience digger hang-time instead of queueing. If both are occurring in close temporal proximity, however, this suggests an inefficiency that could be avoided through better truck assignment.

The flow planner 106 and/or the dispatcher 108 use one or more of these secondary metrics to assist optimisation, either with a weighting factor or as a second-stage optimisation (where the first-stage optimisation focuses on the primary operating costs and primary metrics as described above). Additionally or alternatively the secondary metrics can be used as a measure of how a particular policy affects the overall performance.

The estimator 110 uses current and historical data about the mine operation 104 as well as data describing assets that can be used in the mine operation in order to determine and provide future estimates to the system 100. As used herein, "current data" is used to describe substantially current data, for example pertaining to the current mine shift, even if there may be some time lag, for example relating to data acquisition and communication.

The future estimates include estimates regarding the expected performance of assets, referred to herein as "estimated asset parameters" (e.g. how long a truck is expected to take to perform a certain task), as well as future conditions of the mine operation 104 (e.g. what will the traffic be on a route in the mine that the truck will traverse, and that would therefore impact how long the truck is expected to take).

In some embodiments the estimator 110 also provides other global mine data to the system 100, for example data including current system operational data that describe the current and past conditions of the mine operation 104. In some embodiments, the estimator 110 "slices" the data in specific ways to condition the global mine data provided to the system 100 on specific state or configuration information.

For vehicle movements, for example, one or more of the following data may be used to estimate future activity duration per vehicle, per group of vehicles, and/or per vehicle type in order to respond to travel time performance queries:
1. The road network along which vehicles can move, including the connectivity and layout, the locations of major end-points (e.g. for diggers and dumps), and the basic road rules (e.g. right of way at intersections, speed limits, etc.);
2. Individual vehicle performance parameters on the roads (based on the actual time taken to get from A to B per vehicle); and
3 The task performance at end-points (i.e. time taken to load and dump for a haul truck).

1. Road network: The road network and location data may be obtained from, for example, the planned material movements (for example in the form of a mine plan), or from information retrieved from the mine and its equipment (for example from the mine operation database 124 which, in an embodiment, may be a mine automation system database).

2. Performance parameters: Vehicle performance parameters may be determined using (a) an empirical method, (b) a generative model method, or (c) a combination of (a) and (b).

(a) Empirical method: Measuring and logging previous vehicles' performance, e.g. how long a particular vehicle took on a particular route from A to B for each time that route A to B is traversed.

(b) Generative model method: A generative vehicle model may be used, with parameters such as mass, engine power, friction coefficients, etc. in order to simulate the vehicle's speed profile (and thus travel time) for a specified route. The generative model method is effective where there is a lack of empirical data. A generative model may be able to handle the nominal case for expected travelling speeds along roads. However any real-world or environmental effects that are not represented in the data contained in the relevant mine operation database cannot be used as inputs to the model. Such effects may include the quality of the road surface due to the regular degradation over time or rain in the pit (causing drivers to drive slower than the model would predict), limited visibility due to dust or direct sunlight in the cabin (causing drivers to drive slower than the model predicts), speed limits, signage, safety rules or other operational factors that may not be reflected in the road network data, and mistakes in the road network layout (such as incorrect altitude or road layout information, causing a generative model to under/over-predict the travel time between locations).

(c) Combination method: The empirical method may provide incomplete data if there is a lack of data, such as the first few runs of a particular haul cycle, or after a step-change in the road network or end-point operations. The empirical method can be a good measure of future performance, however it may provide incomplete data if the end-points move, or if the haul cycle has not been performed before (or recently). It will also lag behind any changes in performance, such as if a grader starts or stops operating on a particular section of road, or if there is otherwise a significant change in traffic on the network. Accordingly, in some embodiments, the estimator 110 utilises a combination of both empirical and generative estimation methods (and other available traffic information, e.g. in the form of a traffic model). Where existing implementations rely on full haul-cycle timings, times across shorter segments may be used so that it is more likely that reliable performance data will be available (especially at start-up or following some change in the system configuration). Where reliable segment-based performance data is not available, the estimator 110 can use the generative model as a fall-back to calculate expected travel times for those segments. Therefore, in some embodiments the estimator 110 estimates the expected travel times and provides them to the flow planner 106.

The estimator 110 'conditions' a query with respect to a particular performance characteristic on particular subsets of the data that are labelled according to an asset identifier and/or one or more associated asset descriptors, such as a model of haul truck, a specific vehicle (or combination of vehicles), operator, operational mode (manual vs. autonomous), current load, and many other parameters depending on the data that is available. Using the empirical method described above, this allows the estimator 110 to more precisely predict or measure the performance of a specific use-case where an asset is used to perform an asset task that has associated task parameters (e.g. unloading a load at a crusher within certain conditions), by estimating the performance based on similar historical situations.

Where the estimated asset parameter is an activity duration estimate, e.g. travel time or the time taken by a truck to load or unload, the activity duration estimate is determined by first receiving one or more of the following:
one or more asset identifiers, i.e. identifying the asset class or the individual asset,
one or more asset descriptors, e.g. a state of the asset, for example a loaded or unloaded truck,
one or more asset tasks, e.g. travelling along an asset route that comprises location data and destination data, loading or unloading a haul
one or more task parameters associated with the one or more asset tasks.

Then a set of asset parameters associated with the asset identifier, the asset descriptor, and the asset task is identified. For example, the set of asset parameters in this example includes the asset identifier being a particular truck, the asset descriptor being a loaded truck, and the asset task being traversing a route and/or loading and unloading the truck. An asset parameter associated with the asset task may be the vehicle speed of a truck, or the travel time of the truck for a particular route. The estimator 110 determines the estimated asset parameter by merging the set of asset parameters. In some embodiments the merging may also include merging historical data that describes one or more of the asset parameters, e.g. times previously taken to traverse a route. In some embodiments the merge is performed deterministically, e.g. as an average of the measured travel times.

In one embodiment the estimator 110 is implemented as a multi-stage filter to analyse the raw data collected in the mine operation database 124 in order to determine the future estimates by considering the higher level activities that took place (such as driving along a specific segment of road) and the properties of that action (such as the vehicle, driver, load, etc.). The estimator 110 conducts the analysis as a two-stage 'map matching' pipeline: first each vehicle location is tagged with potential matching road segments (based on proximity), then in a second stage the vehicle locations are considered as a series (the trajectory of the vehicle) to determine the most likely actual path taken along these road segments, and the most likely transition times between segments. One reason the estimator 110 uses a two-stage process is to mitigate noise in the location data and overlap between segments and locations.

Stage 1: Where there is limited information about the precision of each location observation, the estimator 110 adopts a conservative approach to the location accuracy, based on the observed data quality. Observations within e.g. 10 metres of the line representing the road are considered likely candidates, and otherwise the estimator 110 matches the nearest segment (up to 30 metres) as the candidate.

Stage 2: The estimator 110 resolves the location candidates to activities, determining the transition times based on when the equipment exited the segment (with e.g. at least 3 observations in a row outside the segment). This allows small aberrations in the road network or short-term location noise to be rejected, while still accurately identifying the transition times.

In one embodiment, the estimator 110 includes an Estimated Time of Arrival (ETA) Service which is designed to estimate the travel time for equipment to its current destination in order to determine the future estimates provided by the estimator 110. This is achieved by extracting the equipment's current location and its destination from the mine operation database 124, determining the most likely path from its location to its destination, and the dispatcher 108 querying the estimator 110 for historical data for travel time across each segment between the two locations. The query is conditioned on the direction of travel, the vehicle and its current load, in order for the estimator 110 to make predictions for each segment along the route based on the most likely relevant activity records.

The mining system 100 uses the ETA Service to estimate the travel time remaining on current dispatch assignments in a live operation. This involves the integration of operation data sourced from various operating systems (truck load, locations and destinations, the road network), and historical performance data analysis by the estimator 110 (conditioned on the truck, its load, and the segments it will likely pass through).

Figure 10:
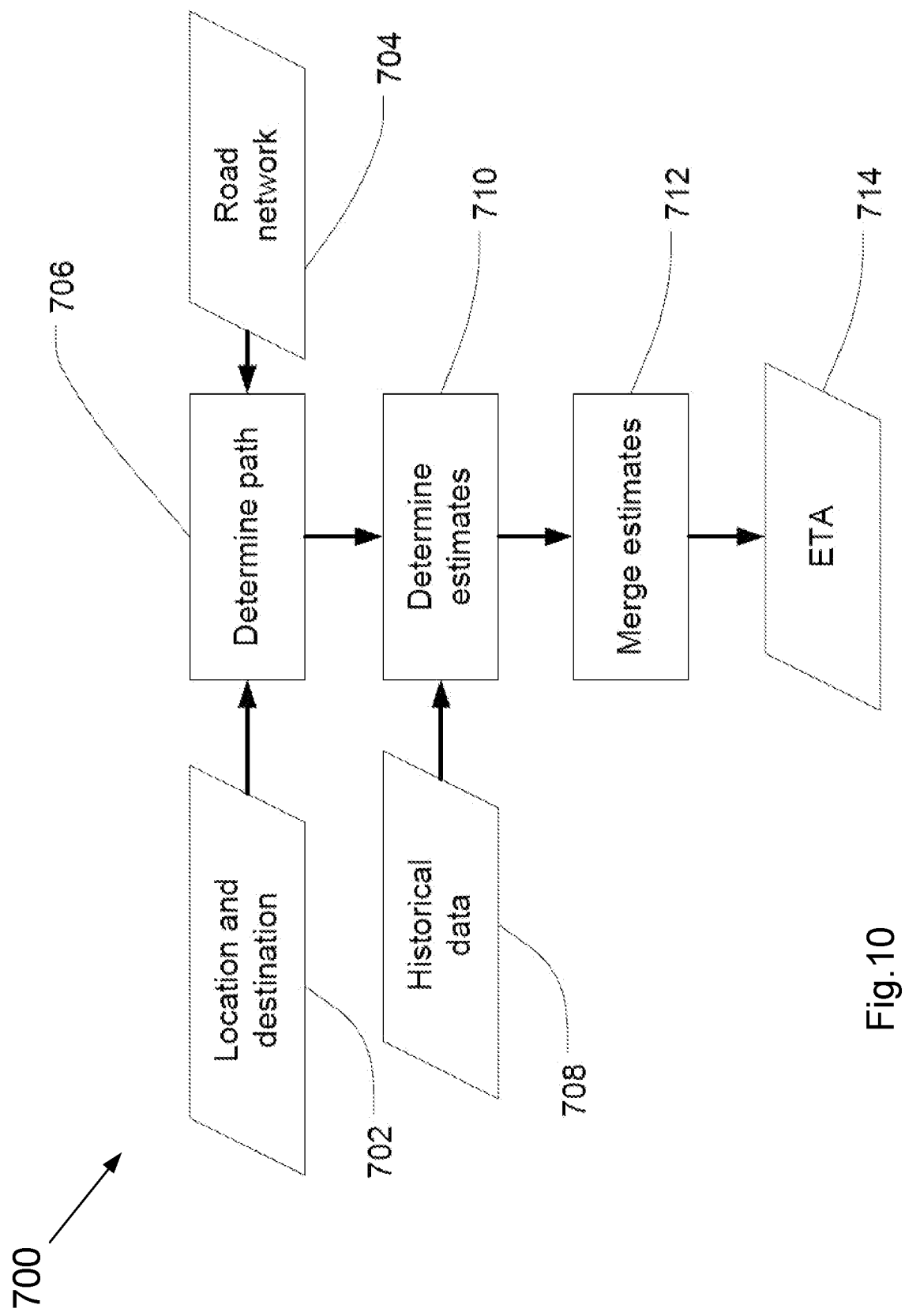
FIG. 10 is a schematic representation of the operation of an embodiment of an estimator.

FIG. 10 of the drawings illustrates an exemplary method 700 that the estimator 110 uses to determine the ETA:
1. Query database for the current location and assigned destination for each vehicle (702);
2. Query database for the current road network (704), this data including any data describing the current situation in the mine relevant to the road network;
3. Determine the most likely path from the current location to the goal (706);
4. For each road segment along this path, analyse historical performance data for activities (708):
   i. of this truck (or trucks like it),
   ii. travelling in the specified direction, and
   iii. with the specified loaded/unloaded state;
5. Determine travel time estimates based on the location and destination data, the road network, and the historical data (710)
6. Merge all estimates together to determine the ETA (712);
7. Output the ETA (714).

The haul-truck exemplary embodiment described herein can readily be extended to all traffic in a mine, as well as to a variety of mine equipment.

One or more Big Data frameworks or platforms may be used to implement the processing and data storage of the estimator 110. Preferably the Big Data framework(s) used must be able to support the high processing and data storage requirements of a long-term complex operation. In one exemplary embodiment, the estimator 110 is implemented as a combination of a Big Data processing platform and a Big Data data storage platform, the estimator 110 processing the raw data into the activities. The estimator 110 can then rapidly query the activities to find those that match particular parameters, such as all movements of a specific model truck over a particular region of the mine, while fully loaded.

The Big Data platforms allow distribution of processing tasks in a style suitable for the analysis of discrete sections and segments of operation data, such as matching raw data to higher-level locations or tasks, or determining transition and interaction points from short data sequences. The use of a Big Data file system allows distribution of large data structures across multiple nodes, so that both processing and querying of the data can be distributed and balanced between multiple servers. These processing and data distribution capabilities are able to support an increase in the complexity of performance analysis and the number of applications.

Operational behaviours are managed and planned for by the system 100 through the consideration of time in the material flow planning optimisation as well as the dispatch assignment optimisation. By taking the time dimension into consideration, scheduled events can be modelled as part of the optimisation and flow rates as well as dispatch assignments planned around these accordingly.

In some embodiments time-based parameters for planned events such as equipment or road maintenance, breaks, shift change, clean-up, blasting, and similar scheduled events are used as constraints for the flow optimisation problem. The system 100 allows for down-times on the dig and dump end-points (e.g. digger/crusher maintenance, breaks, clean-up if known in advance) and on roads (e.g. blasting, grading if the road would be closed). The system plans around these constraints, so that the required material movements are planned to occur when the equipment and roads are available, ensuring a feasible flow plan is generated.

The system 100 is able to take into consideration the future state of the system and is able to take into consideration the results of dispatching assignments already made. In contrast, existing commercial software relies on the current, instantaneous state of the mine and equipment. In particular, software such as Modular Dispatch™ or Wenco Dynamic Dispatch™, rely on a multi-stage dispatch optimisation algorithm that uses a Linear Program to determine appropriate instantaneous flow rates for each dig unit, and a Dynamic Programming algorithm to allocate haul trucks as they become available on their empty haul routes. Both algorithms operate on the current, instantaneous state of the mine and equipment, and do not consider the future state or results of these assignment choices. They are also somewhat rudimentary in their approach to travel time estimation, with the best publicly available information indicating they simply take an average of the last three cycle-times as the input to the DP and LP algorithms.

One of the primary shortfalls in the approach adopted by existing systems is that the system does not consider how the chosen actions (truck assignments) or other equipment and mine states will propagate forward through time. These systems rely on a human operator to anticipate this shortcoming and fill in the gaps, such as sending trucks to a digger before it is actually ready to receive them, or manually scheduling the last few trucks to a digger before it stands down for some period.

Other limitations of existing systems include the simplistic motion-modelling, whereby only recent cycle times are considered in modelling how long a vehicle will take to complete the haul cycle. This causes problems such as long delays in the system responding to changing traffic conditions, such as a congested intersection or grading of the haul route. The predictive model described herein is able to incorporate this in advance, where a purely empirical measurement of performance can typically only react some time after the fact.

Limitations of existing systems can be overcome through manual intervention; where trained dispatch operators are aware of common problems they can manually reassign trucks to avoid performance impacts. On average there may be as many as one exception (requiring manual intervention of some kind) every haul cycle. The systems and methods described herein are able to overcome these limitations without the need for regular manual intervention, freeing up dispatch operators to focus on the higher-level operations of the mine, communication and safety around the pit.

The methods and systems described herein also reduce the burden on human operators to optimise material movement because the system 100 is able to handle planned maintenance as part of the automated process without needing to rely on operator intervention. The system 100 considers the mine plan (including e.g. a production plan) as well as expected disruptions so that non-steady-state behaviour can be incorporated into the planned flow rates and therefore handled by the dispatching system, reducing the burden on the operators.

The inclusion of the time dimension in flow planning allows a strong feedback loop around the dispatching to keep the system on track. Small errors between the estimated and actual truck performance tend to cause existing scheduling systems to under- or over-perform on some routes, causing an overall reduction in plan conformance. Because the estimator 110 periodically updates the global mine data, the flow planner 106 updates the planned flow rates, and the dispatcher 108 periodically recalculates the dispatcher assignments, the replanning feedback loops 120, 122 help to keep the system 110 on track.

The improved performance of the system resulting from the use of the replanning feedback loops can be seen in FIGS. 8-10, as the resulting flow rates effected by the dispatcher 108 closely track the planned flow rates provided by the flow planner 106. The dispatcher 108 is configured to track the planned flow rates, so as to avoid the dispatch operator regularly re-tuning the system to achieve what the dispatch operator believes to be the ultimate goal. This is something that has been seen to occur frequently in real operations, for example because typical dynamic and linear programming (DP and LP) algorithms are reactive and instantaneous, and not aware of the overall plan.

Beyond its use in an asset dispatching system, the flow planner 106 can find application as a planning tool in several cases. Firstly, it can be used by planners to evaluate the feasibility of a plan given the planned events for the day. It can also be used to determine the impact of scheduling a break or maintenance event on the mine's ability to achieve a given plan. Finally, it can be used to evaluate the performance of existing dispatching systems by calculating the theoretical number of truck operating hours required to move the amount of ore actually moved in the shift, given the events that actually occurred, and comparing that to the number of truck operating hours that were actually used.

One key differentiation between the dispatcher 108 described herein and those offered commercially is the level of detail used by the optimisation. This takes on a number of forms:

The equipment within the system is modelled individually, and conditionally upon specific states and configurations, so that the forward-prediction of performance will not just represent the fleet or class of vehicles as a whole, but the specific vehicle and its current state and configuration.

The equipment is forward-modelled based on the current road network and known traffic within the network, so that operational changes take effect immediately, and predictable impacts (like a slow vehicle) can be modelled when (and only when) they will be encountered, rather than requiring multiple load-haul cycles to react to the impact (and again if/when the impact is resolved).

The dispatching system uses modern optimisation techniques that utilise these detailed forward-predictions to select the assignment schedule that will best bring the mine towards the desired state by the end of the shift.

This is enabled by allowing the dispatcher 108 to optimise the material movements across the full shift (and beyond), including known down-time events, thereby automatically tracking the planned flow rates instead of requiring the dispatcher 108 to regularly adjust the optimisation inputs to track the plan.

The estimator 110 described herein provides data-driven analytics for vehicles and fleets on mine sites for a wide variety of use-cases. The estimator 110 provides performance characteristics for modelling to support simulation and optimisation of the load-haul system. These statistics also support online analytical tools to allow mine operators to better understand the historical and current performance of their vehicles and fleets, by analysing operational data integrated from across multiple Original Equipment Manufacturer (OEM) systems. In some embodiments, the estimator 110 capabilities extend beyond basic performance queries to allowing identification of problems in the system as a whole, either through experts making specific queries (checking for the presence of known faults) or automatically, by highlighting rapid and unexpected changes in performance.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A mining system for directing mine operations, the system including:
a data input that includes an estimator computing device, wherein the estimator computing device is configured to:
determine and provide time-based statistics including future estimates that estimate future parameters and/or conditions relating to the mine operation;
generate, based on an operational mode of at least one vehicle of a plurality of vehicles, a query, wherein the operational mode corresponds to whether the at least one vehicle is operating autonomously; and
receive, in response to the query, first vehicle data corresponding to the at least one vehicle;
wherein the data input is configured to:
receive a real-time stream of sensor data from one or more sensors located at a mine; and
provide global mine data that includes the future estimates and the sensor data;
a flow planner computing device; and
a dispatcher computing device, wherein the flow planner computing device is configured to:
  receive operating parameters;
  receive the global mine data from the data input;
  calculate a flow plan based on the operating parameters and the global mine data, wherein the flow plan is for a flow planning window of time, wherein the flow planning window has a starting point and horizon, wherein the flow plan includes at least one planned flow rate for the flow planning window, and wherein the at least one planned flow rate varies with time within the flow planning window;
  send, via a communication network and to the dispatcher computing device, the flow plan;
  receive, via the real-time stream of sensor data and after sending the flow plan to the dispatcher computing device, updated global mine data;
  receive vehicle data indicating, for each of the plurality of vehicles, one or more of: vehicle speed, vehicle loading, and vehicle dumping performance, wherein the vehicle data comprises the first vehicle data;
  receive, from at least one of the one or more sensors, traffic data indicating a current traffic status of the mine;
  detecting, based on the vehicle data, using a traffic model to process the traffic data, and after sending the flow plan to the dispatcher computing device, a traffic condition in the mine;
  generate, based on the traffic condition, an updated flow plan; and
  send, via the communication network and to the dispatcher computing device, the updated flow plan; and
wherein the dispatcher computing device is configured to:
  based on determining that the first vehicle data indicates that the at least one vehicle of a plurality of vehicles is operating in an autonomous mode:
    determine a dispatch planning window, wherein the dispatch planning window is a moving window within the flow planning window, and wherein the moving window has a receding horizon or a decreasing horizon based on the horizon of the flow planning window;
    determine dispatch assignments based on the flow plan from the flow planner computing device and the dispatch planning window;
    cause a dispatch of the at least one vehicle of the plurality of vehicles operating in the autonomous mode based on the dispatch assignments by generating and transmitting to at least one autonomous vehicle, instructions that cause the at least one vehicle of the plurality of vehicles operating in the autonomous mode to travel using turn-by-turn directions towards a first dispatch location;
    receive, from the flow planner and after causing the dispatch of the at least one vehicle of the plurality of vehicles operating in the autonomous mode, the updated flow plan;
    determine a second dispatch planning window within a subset of the flow planning window; and
    cause, based on the updated flow plan and the second dispatch planning window, a change in the dispatch of the at least one vehicle of the plurality of vehicles operating in the autonomous mode by transmitting, to the at least one vehicle of the plurality of vehicles operating in the autonomous mode, updated instructions that cause the at least one vehicle of the plurality of vehicles operating in the autonomous mode to travel towards a second dispatch location.

2. The mining system of claim 1, wherein the operating parameters include at least one production target and at least one cost-related goal.

3. The mining system of claim 1, wherein the global mine data includes at least one of the following mine operation data: historical data, current system operational data, asset data, and future estimates.

4. The mining system of claim 1, wherein the operating parameters include a material flow target,
  wherein the flow planner computing device is further configured to generate the flow plan to achieve the material flow target; and
  wherein the flow plan spans a predetermined period of time, and specifies a planned flow rate for each time unit within the predetermined period of time.

5. The mining system of claim 1, the system further including:
  a planner computing device configured for providing the operating parameters;
  wherein the flow planner computing device is configured to determine the at least one planned flow rate based on at least one of each of the operating parameters and the global mine data, and
  wherein the flow planner computing device is configured to determine the at least one planned flow rate by optimizing a goal defined by at least one of each of the operating parameters and the global mine data within the flow planning window.

6. The mining system of claim 1, the system further including:
  a planner computing device configured for providing the operating parameters;
  wherein the data input is configured for providing the global mine data and updated global mine data;
  wherein the flow planner computing device is configured to determine the at least one planned flow rate based on at least one of each of the operating parameters and the global mine data, wherein the flow planner computing device is configured to determine at least one updated planned flow rate based on the updated global mine data and wherein the flow planner computing device is configured to determine the at least one updated planned flow rate over the second dispatch planning window; and
  the dispatcher computing device is configured to determine the dispatch assignments based on the at least one updated planned flow rate from the flow planner computing device.

7. The mining system of claim 1, the system further including:
  a planner computing device configured for providing the operating parameters;
    wherein the flow planner computing device is configured to determine the flow plan based on at least one of each of the operating parameters and the global mine data,
  wherein the dispatcher computing device is configured to determine the dispatch assignments based on the flow plan and the global mine data, and
    wherein the dispatcher computing device is further configured to determine the dispatch assignments so as to effect an actual flow rate that varies over time in alignment with the at least one planned flow rate that varies over time.

8. The mining system of claim 1, the system further including:
- a planner computing device configured for providing the operating parameters;
- wherein the flow planner computing device is configured to determine the flow plan based on at least one of each of the operating parameters and the global mine data; and
- wherein the dispatcher computing device is configured to determine the dispatch assignments based on the flow plan and the global mine data,
- wherein the dispatcher computing device includes a dispatcher feedback loop, and the dispatcher computing device uses the dispatcher feedback loop to update the dispatch assignments.

9. The mining system of claim 1, the system further including:
- a planner computing device configured for providing the operating parameters;
- wherein the flow planner computing device determines the flow plan based on at least one of the operating parameters and the global mine data; and
- the dispatcher computing device is configured to:
  - determine the dispatch assignments based on the flow plan and the global mine data,
  - update the dispatch assignments at least once during the flow planning window, and
  - effect the dispatch of equipment based on the updated dispatch assignments so that the dispatch of equipment aligns with the flow plan.

10. The mining system of claim 1, the system further including:
- a planner computing device configured for providing the operating parameters;
- wherein the flow planner computing device is configured to determine the flow plan based on at least one of the operating parameters and the global mine data; and
- the dispatcher computing device is configured to determine dispatch assignments based on the flow plan and the global mine data, and effects the dispatch of equipment based on the dispatch assignments,
- wherein the following conditions apply:
  - the flow plan includes at least one planned flow rate that varies over time within the flow planning window, and
  - the dispatcher computing device is configured to effect the dispatch of equipment so as to result in a varying actual flow rate.

11. The mining system of claim 1, the system further including:
- a planner computing device configured for providing the operating parameters;
  - wherein the flow planner computing device is configured to determine the flow plan based on at least one of the operating parameters and the global mine data; and
  - wherein the dispatch of equipment effects an actual flow rate that is aligned with the at least one planned flow rate that varies so that the actual flow rate also varies over the flow planning window.

12. The mining system of claim 1, the system further including:
- a planner computing device configured for providing the operating parameters;
- wherein the flow plan is determined based on the flow planning window; and
- wherein the estimator computing device is configured to update the future estimates at least once during the flow planning window.

13. The mining system of claim 1, the system further including:
- a planner computing device configured for providing the operating parameters;
- wherein the data input is configured for providing the global mine data and updated global mine data;
- wherein the flow planner computing device is configured to determine the flow plan for the flow planning window that ends at the horizon, wherein the flow planner computing device is configured to determine the flow plan based on at least one of each of the operating parameters and the global mine data; and wherein:
- the flow planner computing device is configured to receive the updated global mine data and determine an updated flow plan based on the updated global mine data,
- the dispatcher computing device is configured to determine updated dispatch assignments based on at least one of: the updated global mine data and the updated flow plan, and the dispatcher computing device is configured to effect the dispatch of equipment based on the updated dispatch assignments, and
- the dispatcher computing device is configured to determine the updated dispatch assignments at a greater frequency during the flow planning window than the flow planner determines the updated flow plan.

* * * * *